United States Patent
Oka et al.

(10) Patent No.: US 6,270,418 B1
(45) Date of Patent: Aug. 7, 2001

(54) ELASTIC SHAFT JOINT

(75) Inventors: Shoji Oka, Gunma-ken; Takahiro Minamigata, Maebashi, both of (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/320,555

(22) Filed: May 27, 1999

(30) Foreign Application Priority Data

| | | | |
|---|---|---|---|
| Jun. 11, 1998 | (JP) | | 10-163276 |
| Feb. 24, 1999 | (JP) | | 11-046551 |
| Mar. 29, 1999 | (JP) | | 11-085415 |

(51) Int. Cl.$^7$ ............... F16D 3/52; B62D 1/19; B25G 3/24

(52) U.S. Cl. ............... 464/89; 74/492; 403/290; 403/57; 464/180

(58) Field of Search .................. 464/89, 78, 90, 464/91, 180, 183, 903; 74/492; 403/74, 314, 383, 290, 57, 58, 157, 159, 221, 225, 226

(56) References Cited

U.S. PATENT DOCUMENTS

| | | | | |
|---|---|---|---|---|
| 4,183,258 | * | 1/1980 | Stephan ................ | 74/492 |
| 4,509,775 | | 4/1985 | Arndt . | |
| 5,090,833 | * | 2/1992 | Oertle et al. ........... | 403/12 |
| 5,188,474 | * | 2/1993 | Ohkubo et al. ........ | 403/57 |
| 5,259,818 | * | 11/1993 | Kachi et al. ........... | 464/89 |
| 5,358,350 | | 10/1994 | Oertle . | |
| 5,366,316 | * | 11/1994 | Cymbal ................. | 403/359 |
| 5,580,184 | * | 12/1996 | Riccitelli ............... | 403/365 |
| 5,785,600 | * | 7/1998 | Castellon .............. | 464/89 |
| 5,836,821 | * | 11/1998 | Yamada et al. ........ | 464/89 |
| 5,916,026 | * | 6/1999 | Sadakata ............... | 464/89 |
| 5,931,737 | * | 8/1999 | Aota et al. ............. | 464/89 |

FOREIGN PATENT DOCUMENTS

| | | |
|---|---|---|
| 54-82257 | 6/1979 | (JP) . |
| 56-39325 | 4/1981 | (JP) . |
| 56-131831 | 10/1981 | (JP) . |
| 60-184176 | 9/1985 | (JP) . |
| 60-184717 | 9/1985 | (JP) . |
| 60-184718 | 9/1985 | (JP) . |
| 60-215122 | 10/1985 | (JP) . |
| 60-215123 | 10/1985 | (JP) . |
| 61-201924 | 9/1986 | (JP) . |
| 5-83462 | 11/1993 | (JP) . |
| 5-89964 | 12/1993 | (JP) . |
| 6-78630 | 11/1994 | (JP) . |
| 10-318274 | 12/1998 | (JP) . |
| 11-44327 | 2/1999 | (JP) . |
| 11-48991 | 2/1999 | (JP) . |

OTHER PUBLICATIONS

European Patent Publication No. 0508 856 A1, Oct. 14, 1992 (abstract, claims, and drawings).

French Patent Publication No. 2 614 985, Nov. 10, 1988 (abstract, claims, and drawings).

* cited by examiner

Primary Examiner—Lynne H. Browne
Assistant Examiner—Kenneth Thompson
(74) Attorney, Agent, or Firm—Miles & Stockbridge P.C.

(57) ABSTRACT

An elastic shaft joint comprises a shaft with a pair of outer-diameter side engagement surfaces which are substantially parallel to each other at two positions on the opposite sides of the outer peripheral surface in the radial direction, a rotary member with a pair of restraint plate portions which are substantially parallel to each other, having an opening on a lateral side thereof, and a vibration absorbing member provided between the rotary member and the shaft. The vibration absorbing member is constituted by an elastic member disposed on the inner peripheral surface of a part fixed to the rotary member and a sliding sleeve which is supported by the inner peripheral surface of the elastic member and which inner peripheral surface is in slidable contact with the outer peripheral surface of the shaft.

4 Claims, 20 Drawing Sheets

ELASTIC SHAFT JOINT

This application claims the benefits of Japanese Application Nos. 10-163276, 11-046551 and 11-085415 which are hereby incorporated by reference.

BACKGROUND OF THE INVENTION

1. Field of the Invention

The present invention relates to an elastic shaft joint which is assembled into a universal joint for constituting, for example, a steering apparatus for a car so as to transmit a motion of a steering wheel to a steering gear and to prevent a vibration on the side of the steering gear from being transmitted to the steering wheel.

2. Related Background Art

A steering apparatus for a car is arranged to transmit a motion of a steering shaft which is rotated by a steering wheel to a steering gear so as to give a steering angle to the wheels. Normally, the steering shaft and the input shaft of the steering gear can not be disposed on the same straight line. For this reason, a universal joint is arranged between the steering shaft and the input shaft to transmit a motion of the steering wheel to the steering gear. A vibration absorbing ability is conventionally given to the universal joint, in order to prevent the vibration which is transmitted from the wheels to the steering gear when the car is run from further being transmitted to the steering wheel to give unpleasant feeling to the driver. In order to give the vibration absorbing capability to the universal joint in this manner, an elastic material such as rubber is usually assembled into this universal joint so that the transmission of the vibration is prevented by use of the elastic material.

As such an elastic shaft joint or a universal joint assembling such elastic shaft joint therein, there are conventionally known joints disclosed in Japanese Patent Application Laid-Open Nos. 56-39325 (French Patent Application Laid-Open No. 2464404), 56-131831, 60-184716 to 60-184718, 60-215122, and 60-215123, 61-201924, Japanese Utility Model Application Laid-Open Nos. 54-82257, 5-83462, and 5-89964, French Patent Application Laid-Open No. 2614985, U.S. Pat. No. 4,509,775, etc.

In the elastic shaft joint conventionally known, leaving the case in which a vibration in the direction of rotation of the shaft such as a steering shaft is applied, when a vibration in the axial direction of this shaft is applied, the capacity of the shaft joint to attenuate this vibration is poor, so that the vibration in the axial direction is easily transmitted to the steering wheel. Especially, when a displacement along the axial direction is applied to a part with a shaft mounted thereon, for example, when the distance between the steering gear and the front end portion of the steering shaft is changed due to a vibration upon running of the car, this displacement can not be absorbed. Also, if it is required to absorb a tolerance in manufacturing or assembling the parts when the elastic shaft joint is to be assembled into a steering apparatus of the car, such requirement can not be satisfied. Further, when one end portion of the shaft with the elastic shaft joint assembled therein is inserted in the base end portion of a yoke of a universal joint in the axial direction thereof, this end portion of the shaft is required to be displaced in the axial direction, which also can not be satisfied.

Taking these circumstances into account, such a structure as disclosed in, for example, Japanese Patent Application Laid-Open No. 11-048991 is contrived in which a shaft is divided into a pair of elements and the paired. elements are brought into serration engagement with each other at a coupling portion thereof. Since the portion of the serration engagement between the paired elements allows a large displacement in the axial direction, even when a displacement in the axial direction is applied onto a portion with the shaft mounted thereon upon running of the car, this displacement is absorbed. If a tolerance in manufacturing or assembling of the parts is required to be absorbed when the elastic shaft joint is to be assembled into the steering apparatus of the car, it is possible to prevent such tolerance. Further, when one end portion of the shaft with the elastic shaft joint mounted thereon is to be inserted into the base end portion of the yoke of the universal joint in the axial direction, it is possible to displace this end portion of the shaft in the axial direction.

However, the cost is inevitably increased when the serration engagement portion is provided in a part of the shaft. That is, in order to prevent a backlash of the serration engagement portion, irrespective of presence or absence of vibration in running, it is required to form a slit on the side of an outer shaft on which a highly accurate processing is performed or a female serration is formed, for elastically expanding or contracting the diameter of this outer shaft. Further, it is required to provide a member for elastically contracting the diameter of the outer shaft.

SUMMARY OF THE INVENTION

Taking these circumstances into consideration, an object of the present invention is to provide a practical elastic shaft joint which is capable of absorbing a displacement in the axial direction and securing a sufficient durability though manufactured comparatively at a low cost.

The elastic shaft joint of the present invention is to couple an end portion of a rotatable shaft such as a steering shaft and a rotary member which rotates upon rotation of such shaft, such as a yoke for constituting a universal joint, so as to absorb a certain displacement in the axial direction of the direction of rotation.

Out of such elastic shaft joints of the present invention, an elastic shaft joint according to a first aspect of the invention has a pair of outer-diameter side engagement surfaces which are substantially parallel to each other at two positions on the opposite sides of the outer peripheral surface in the radial direction. The rotary member is provided with a pair of restraint plate portions which are substantially parallel to each other and is formed to have an opening on a lateral side thereof. Then, a vibration absorbing member is provided between the rotary member and the shaft. Then, this vibration absorbing member is constituted by an elastic member which is disposed on the inner peripheral surface of a part fixed to the rotary member and a sliding sleeve which is supported by the inner peripheral surface of this elastic member, which inner peripheral surface is brought into slidable contact with the outer peripheral surface of the shaft.

An elastic shaft joint according to a second aspect of the present invention is provided with a coupling sleeve around one end of the shaft, to allow free displacement of this shaft in the axial direction and to freely absorb a vibration to be transmitted to or from this shaft. Of the rotary member, the base portion, to which an end portion of the shaft is to be coupled and fixed, is formed to have an opening on the lateral side thereof. Then, this coupling sleeve is coupled and fixed to this rotary member to form the elastic shaft joint by inserting the coupling sleeve into this base portion from the lateral opening so as to suppress the coupling sleeve by means of this base portion.

Further, an elastic shaft joint according to a third aspect of the present invention is provided with a pair of outer-diameter side engagement surfaces which are substantially parallel to each other at two positions on the opposite sides of the outer peripheral surface in the radial direction of at least one end portion of the shaft.

A coupling sleeve is disposed in the vicinity of an end portion of the shaft. Then, rotation limiting cylinders are provided at two positions on the inner peripheral surface on the opposite sides in the radial direction, in a half part of this coupling sleeve in the axial direction which is a part closer to the end portion of this shaft. Each of these rotation limiting cylinders is provided with inner-diameter side engagement surfaces which are substantially parallel to each other and face the above-mentioned outer-diameter side engagement surfaces with a gap therebetween in a neutral state in which no phase shift is generated with respect to the direction of rotation between the shaft and the coupling sleeve, so as to limit an amount of rotation of the shaft within the coupling sleeve. On the other hand, a retaining cylinder having a larger diameter than that of the rotation limiting cylinder is provided in the other half part of the coupling sleeve in the axial direction, which is a part closer to a middle portion of this shaft. Between the inner peripheral surface of this retaining cylinder and the outer peripheral surface of the end portion of the shaft, there is provided a vibration absorbing member which prevents the transmission of a vibration to and from the coupling sleeve in the above-mentioned neutral state, but allows displacement of the shaft in the axial direction with respect to this coupling sleeve.

Further, out of the rotary member, the base portion to which one end portion of the shaft is to be coupled and fixed is provided with a pair of restraint plate portions which are substantially parallel to each other and is formed to have an opening on the lateral side thereof. Then, in a state in which the rotation limiting cylinder out of the coupling sleeve is inserted between these two restraint plate portions from the lateral opening, parts closer to the opening ends of these restraint plate portions are coupled to each other by means of a bolt so as to press the restraint plate portions toward each other, thereby connecting and fixing the coupling sleeve to the rotary member.

More preferably, one or more of the following structures (1) to (4) are added.
(1) A shock absorbing member for absorbing an energy of an impact, when the impact is applied in the axial direction, is provided in series with respect to the above-mentioned shaft, to contract the total length of the shaft.
(2) A stopper is disposed between the rotation limiting cylinder and the shaft for restricting a displacement in the axial direction of the rotation limiting cylinder and the shaft within a predetermined range to prevent the shaft from being drawn out of the shaft.
(3) Sealing members for preventing foreign substances from advancing into the coupling sleeve are provided between the opening end portions of the retaining cylinder and the outer peripheral surface of the middle portion of the shaft and at the opening end portion of the rotation limiting cylinder.
(4) Locking portions are provided on the lateral portions of the paired restraint plate portions for constituting the base portion of the rotary member, while the coupling sleeve is provided with an insertion plate which can freely advance to parts opposite to these locking portions and, after the advancement, is prevented from coming off from these parts opposites to the locking portions on the basis of an engagement with these locking portions, and an elastic stretching piece which is protruded from the opening side of the pair of restraint plate portions out of the peripheral surface of the coupling sleeve, so that the coupling sleeve can be freely pressed to the interior part of the base portion on the basis of the engagement with the outer peripheral surface of the middle portion of a coupling member which couples the rotary member to the coupling sleeve by reducing a distance between the paired restraint plate portions.

The effect obtained when a rotating force is transmitted by preventing transmission of a-vibration by means of the elastic shaft joint according to the second aspect of the invention, out of the elastic shaft joints of the present invention constructed as described above, is as follows. Even in case of transmission of the rotational force, if the rotational force to be transmitted is of low torque, the rotational force is transmitted via the vibration absorbing member. When the rotational force to be transmitted is of low torque as described or when the rotational force is not transmitted, the vibration absorbing member prevents the transmission of the vibration between the coupling sleeve which is coupled and fixed to the rotary member, and the shaft. The vibration and displacement in the axial direction is absorbed when the vibration absorbing member is displaced in the axial direction and the vibration absorbing member and the shaft slide relative to each other.

Also, when the torque of the rotational force to be transmitted is large, the pair of outer-diameter side engagement surfaces formed on one end of the shaft are brought into contact with the inner-diameter side engagement surfaces, and the rotational force is transmitted between the shaft and the rotary member to which the coupling sleeve is fixed. That is, the rotational force which can not be transmitted by the vibration absorbing member is transmitted by a contact portion between the outer-diameter side engagement surfaces and the inner-diameter side engagement surfaces. As a result, an excessive stress is not applied onto this vibration absorbing member, so that the durability of this vibration absorbing member can be sufficiently secured.

Since the rotary member and the coupling sleeve are coupled to each other by inserting the rotation limiting cylinder of this coupling sleeve between the pair of restraint plate portions for forming this rotary member from the lateral opening thereof, this coupling work is not hindered even if there is a little gap between the axial position of the rotary member and that of the coupling sleeve. Also, it is not necessary to displace the shaft in the axial direction at the time of this coupling work. Consequently, there is no need to employ an expensive structure such as a serration engagement portion or the like.

If the shock absorbing member is provided, as stated in (1) above, it is possible to ease the impact which is applied to the body of the driver from the steering wheel at the time of a collision, thereby protecting the driver more effectively.

Also, as stated in (2) above, if a rough engagement portion is arranged between the rotation limiting cylinder and the shaft, it is possible to prevent the shaft from falling off from this rotation limiting,cylinder at the time of conveyance, thereby saving a trouble caused by the separation of the coupling sleeve from the shaft.

Also, as stated in (3) above, if the sealing members are arranged between the opening end portion of the retaining cylinder and the outer peripheral surface of the middle portion of the shaft, and at the opening end portion of the rotation limiting cylinder, it is possible to prevent foreign substances such as water or dust from advancing into the coupling sleeve, thereby preventing rust on the outer peripheral surface of one end portion of this shaft or increase of a sliding-resistance of the sliding portion.

Further, as stated in (4) above, if, in the state in which the coupling sleeve is thrust into the interior part of the base portion of the rotary member, the coupling sleeve is arranged not to be drawn from the base portion owing to the engagement between the insertion plate and each of the locking portions, and moreover, the coupling sleeve is arranged to be urged upon the interior part of the base portion owing to the engagement between the outer peripheral surface of the middle portion of the coupling member and the elastic stretching piece, a work for coupling the shaft with the coupling sleeve mounted thereon to the rotary member can be conducted easily while making the center of rotation of one member corresponding to that of the other member.

DESCRIPTION OF THE PREFERRED EMBODIMENTS

Figure 1:
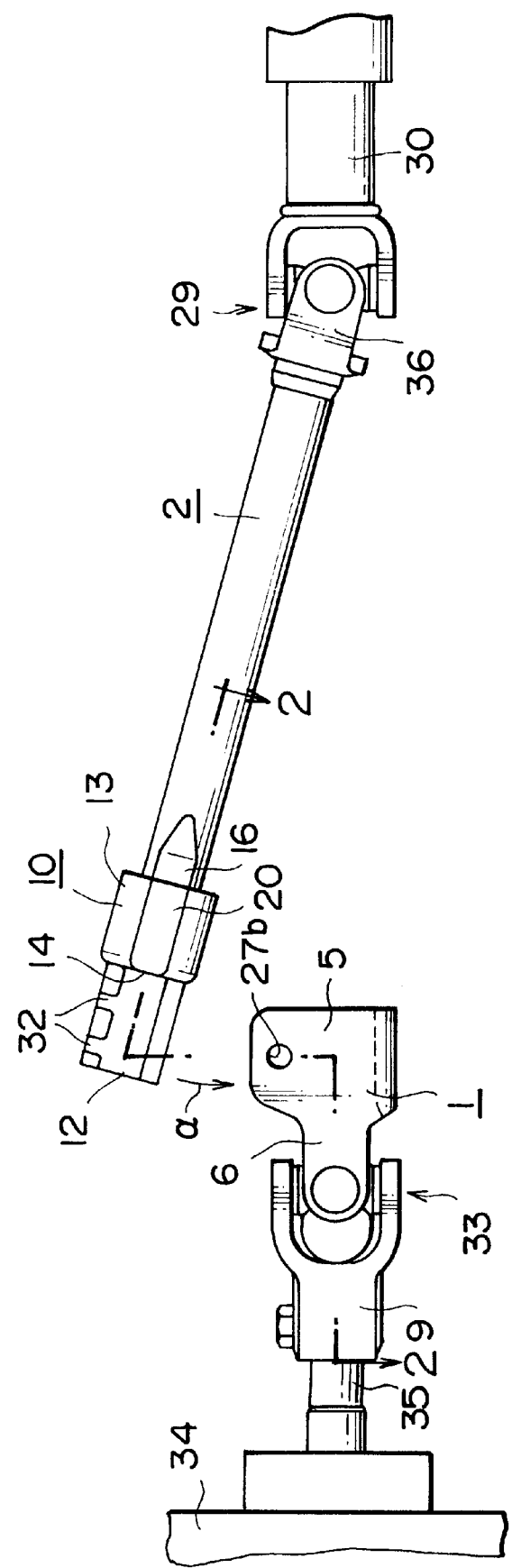
FIG. 1 is a side view for showing a first embodiment of the present invention, in a state that the elastic shaft joint is in the process of assembling.

FIGS. 1 to 4 show a first embodiment of the present invention. In this embodiment, an elastic shaft joint 3 of the present invention is constituted by a yoke 1 of a universal joint for forming a steering apparatus of a car, and a shaft 2 to be coupled to this yoke 1. The yoke 1 which is corresponding to the rotary member described above is provided with a base portion 4 which is formed from a steel plate by plastic working such as bending and punching with a press or forging. This base portion 4 has a pair of restraint plate portions 5, 5 which are substantially parallel with each other and integrally formed at one end thereof, and is formed to be open at the other end, that is, at a lateral side thereof, to have a U-shaped cross section. A pair of arms 6, 6 are formed to be extended from the front end edge portions of the parallel restraint plate portions 5, 5 for forming such base portion 4 in the axial direction (the left end edge portions in FIGS. 1 and 2). Another yoke 9 is rockably coupled to the front end edge portions of the paired arms 6, 6 via a cross shaft 7 and needle bearings 8, 8, thereby forming a universal joint of a Cardan type. The elastic shaft joint of the present embodiment is assembled in such universal joint to couple an end portion of the shaft 2 which rotates upon an operation of the steering wheel and the yoke 1 which rotates upon rotation of this shaft 2 so as to absorb a certain displacement in the axial direction and the direction of rotation.

Such an elastic shaft joint of the present invention is provided with a coupling sleeve 10 and a vibration absorbing member 11, in addition to the yoke 1 and the shaft 2 mentioned above. Out of these components, the coupling sleeve 10 is formed from a metal plate such as a steel plate or a stainless steel plate by drawing or the like to have a cylindrical shape as a whole. The coupling sleeve 10 is integrally comprised of a rotation limiting cylinder 12 which is formed in a half part in the axial direction (the left part in FIGS. 1 and 2) closer to one end of the shaft 2 and a retaining cylinder 13 which is formed in the other half part in the axial direction (the right part in the same drawings) closer to the middle portion of the shaft 2, with a step portion 14 therebetween. The coupling sleeve 10 may be formed from sintered metal.

The rotation limiting cylinder 12 has a oval-shaped cross section, and is provided with inner-diameter side engagement surfaces 15, 15 which are substantially parallel to each other. Note that in the illustrated embodiment, these inner-diameter side engagement surfaces 15, 15 are formed to be convex surfaces each with a partially cylindrical plane. However, these engagement surfaces may be formed as simple flat surfaces. On the other hand, a pair of outer-diameter side engagement surfaces 16, 16 are formed on one end portion of the shaft 2 (the left end portion in FIG. 1) at two positions on the opposite sides in the radial direction to be substantially parallel to each other. In the illustrated embodiment, these outer-diameter side engagement surfaces 16, 16 are formed to be flat surfaces which are parallel to each other, and the one end portion of the shaft 2 to have an oval-shaped cross section. Note that the outer-diameter side engagement surfaces 16, 16 may be formed as convex surfaces each with a partial cylindrical plane, and the inner-diameter side engagement surfaces 15, 15 may be formed as flat surfaces. Such one end portion of the shaft 2 and the rotation limiting cylinder 12 are combined concentrically with each other in a state that the one end portion of the shaft 2 is inserted in the rotation limiting cylinder 12. The inner-diameter side engagement surfaces 15, 15 are formed to face the outer-diameter side engagement surfaces 16, 16, respectively, with a gap therebetween in a neutral state that the one end portion of the shaft 2 and the rotation limiting cylinder 12 are combined with each other as described above and no phase shift is generated with respect to the direction of rotation between the shaft 2 and the coupling sleeve 10.

Also, in the illustrated embodiment, the inner-diameter side cylindrical surfaces 17, 17 which couple the paired inner-diameter side engagement surfaces 15, 15 to each other on the inner peripheral surface of the rotation limiting cylinder 12 and the outer-diameter side cylindrical surfaces 18, 18 which couple said paired outer-diameter side engagement surfaces 16, 16 to each other on the outer peripheral surface of the one end portion of the shaft 2 are formed as partially cylindrical surfaces which are concentric with each other with the central axes of the shaft 2 and the rotation limiting cylinder 12 as the respective centers thereof. Then, a pair of guide bushes 19, 19 each having an arched cross section are retained by and between the inner-diameter side cylindrical surfaces 17, 17 and the outer-diameter side cylindrical surfaces 18, 18, respectively. These guide bushes 19, 19 are formed of synthetic resin such as polyamide resin or poly-tetrafluoro-ethylene resin or polyacetal resin or low-frictional material such as oil-contained metal, so as to serve to support the end portion of the shaft 2 and the rotation limiting cylinder 12 concentrically with each other with a little displacement allowed in the direction of rotation. Such guide bushes 19, 19 are preferably fixed either to the inner-diameter side cylindrical surfaces 17, 17 or the outer-diameter side cylindrical surfaces 18, 18 by bonding, or the like.

Figure 3:
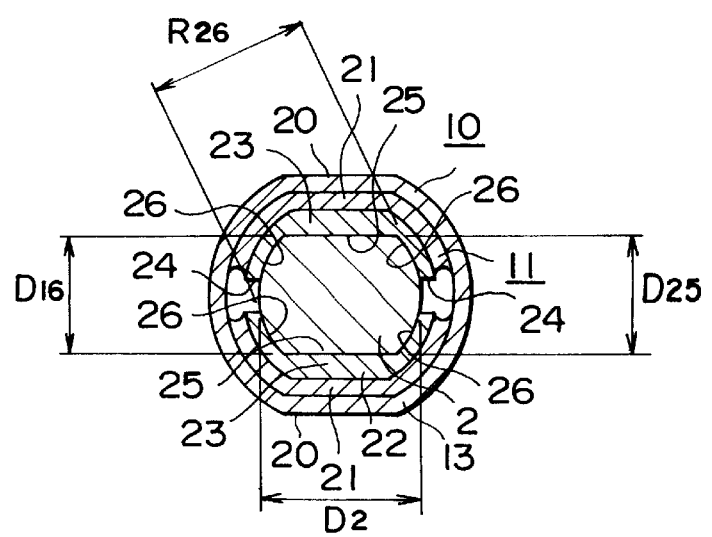
FIG. 3 is a cross-sectional view of the joint taken along line 3—3 in FIG. 2.

Also, the retaining cylinder 13 mentioned above is formed to have a larger diameter than that of the rotation limiting cylinder 12. In the illustrated embodiment, a pair of flat portions 20, 20 are formed in this retaining cylinder 13 at two positions on the opposite sides in the radial direction. Then, the vibration absorbing member 11 is disposed between the inner peripheral surface of the retaining cylinder 13 and the outer peripheral surface closer to the middle portion of the one end portion of the shaft 2. This vibration absorbing member 11 is comprised of an elastic member 21 and a sliding sleeve 22. The elastic member 21 is made of elastic material such as elastomer like rubber, and retained and fixed to the inner peripheral surface of the retaining cylinder 13 by backing, bonding, or the like, so that the positional relation of the elastic member 21 with this retaining member 13 is not changed. Then, the sliding sleeve 22 is retained by and fixed to the inner peripheral surface of this elastic member 21. This sliding sleeve 22 is formed, as shown in FIG. 3, by a pair of sleeve elements 23, 23 each with a substantially arched cross section are combined with each other cylindrically with gaps 24, 24 between the end edges thereof in the circumferential direction. The paired sleeve elements 23, 23 are also made of low-frictional material in the similar manner as the guide bushes 19, 19 and retained by and fixed to the inner peripheral surface of the elastic member 21 by backing, bonding, or the like.

The inner peripheral surfaces of the sleeve elements 23, 23 each is comprised of an inner-diameter side flat surface 25 which is positioned in the middle part in the circumferential direction and inner-diameter side cylindrical surfaces 26, 26 which are positioned at both end portions in the circumferential direction. The paired sleeve elements 23, 23 are combined with each other to form the sliding sleeve 22, and further, in a state that the one end portion of the shaft 2 is inserted (thrust) into this sleeve 22, the inner-diameter side flat surfaces 25, 25 existing on the inner peripheral surfaces of these sleeve elements 23, 23 are formed to be parallel to each other so that the inner-diameter side cylindrical surfaces 26, 26 are arranged to exist on the same cylindrical surface.

Now description will be made on the relationship between the dimensions of the sliding sleeve 22 constituted by the paired sleeve elements 23, 23 in a free condition and the dimensions of the cross section of the end portion of the shaft 2 provided with the outer diameter side engagement surfaces 16, 16 as described above. Note that the dimensions of the sliding sleeve 22 in a free condition are those in a state in which the shaft 2 is not inserted (thrust) into the sliding sleeve 22 and the paired sleeve elements 23, 23 for forming this sliding sleeve 22 are displaced inward in the radial direction of the retaining cylinder 13 based on the elasticity of the elastic member 21. When the outer diameter of the front end portion of the shaft 2 is D2 and the diameter of a circle which is formed by the inner-diameter side cylindrical surfaces 26, 26 existing on the inner peripheral surfaces of the paired sleeve elements 23, 23 is R26, this diameter R26 is equal to or a little smaller than the outer diameter D2 (R26≦D2). Also, the distance D16 between the outer-diameter side engagement surfaces 16, 16 formed in the one end portion of the shaft is set to be a little larger than the distance D25 between the inner-diameter side flat surfaces 25, 25 existing on the inner peripheral surfaces of the paired sleeve elements 23, 23 (D16>D25).

The sliding sleeve 22 which has the above dimensional relationship and the end portion of the shaft 2 are combined with each other, by inserting (thrusting) the end portion of the shaft 2 into the sliding sleeve 22 while displacing the paired sleeve elements 23, 23 outward in the radial direction of the retaining cylinder 13 against the elasticity of the elastic member 21. Also, in such combined state, the end portion of the shaft 2 is loosely inserted into the rotation limiting cylinder 12. Note that, in order to insert this shaft 2 into the sliding sleeve 22 more easily, the front end edge of the shaft 2 is preferably to be chamfered (not shown). In a state that the sliding sleeve 22 and the end portion of the shaft 2 are thus combined with each other, the inner-diameter side flat surfaces 25, 25 on the inner peripheral surfaces of the sleeve elements 23, 23 for forming the sliding sleeve 22 and the inner-diameter side cylindrical surfaces 26, 26 are elastically pressed onto the outer peripheral surface of the end portion of the shaft 2 owing to the elasticity of the elastic member 21.

On the other hand, the distance D5 between the paired restraint plate portions 5, 5 integrally provided in the base portion 4 of the yoke 1 in a free state is set to be equal to or a little larger than the thickness T12 of the rotation limiting cylinder 12 (D5≧T12). Also, circular through holes 27a, 27b are formed at positions which are aligned with each other in portions closer to opening ends of the restraint plate portions 5, 5, so that a bolt 28 can be passed. In a state that the rotation limiting cylinder 12 is inserted up to the interior part of the base portion 4 to constitute the elastic shaft joint of the present invention, this rotation limiting cylinder 12 does not interfere with the bolt 28 which is passed through the holes 27a, 27b.

An operation for constituting the elastic shaft joint of the present invention by combining the respective constituent parts as mentioned above will be conducted, for example, in the following manner. That is, the shaft 2 on which the coupling sleeve 10 has been supported through the vibration absorbing member 11 at one end portion thereof, has the other end portion coupled to the front end portion of a steering shaft 30 through a universal joint 29. The shaft 2 is caused to swing around the universal joint 29 as the center to be displaced from this state to the direction indicated by an arrow a in FIG. 1, so that the rotation limiting cylinder 12 of the coupling sleeve 10 is inserted into the base portion 4 of the yoke 1. Note that another universal joint 33 having this yoke 1 is coupled to the input shaft 35 of a steering gear 34 in advance. Since the base portion 4 is formed by the paired restraint plate portions 5, 5 to be laterally opened, there is no need of displacing this shaft 2 in the axial direction at the time of this insertion. Moreover, even if the axial position of the yoke 1 deviates a little from that of the shaft 2, no operation is required to correct this deviation.

Figure 4:
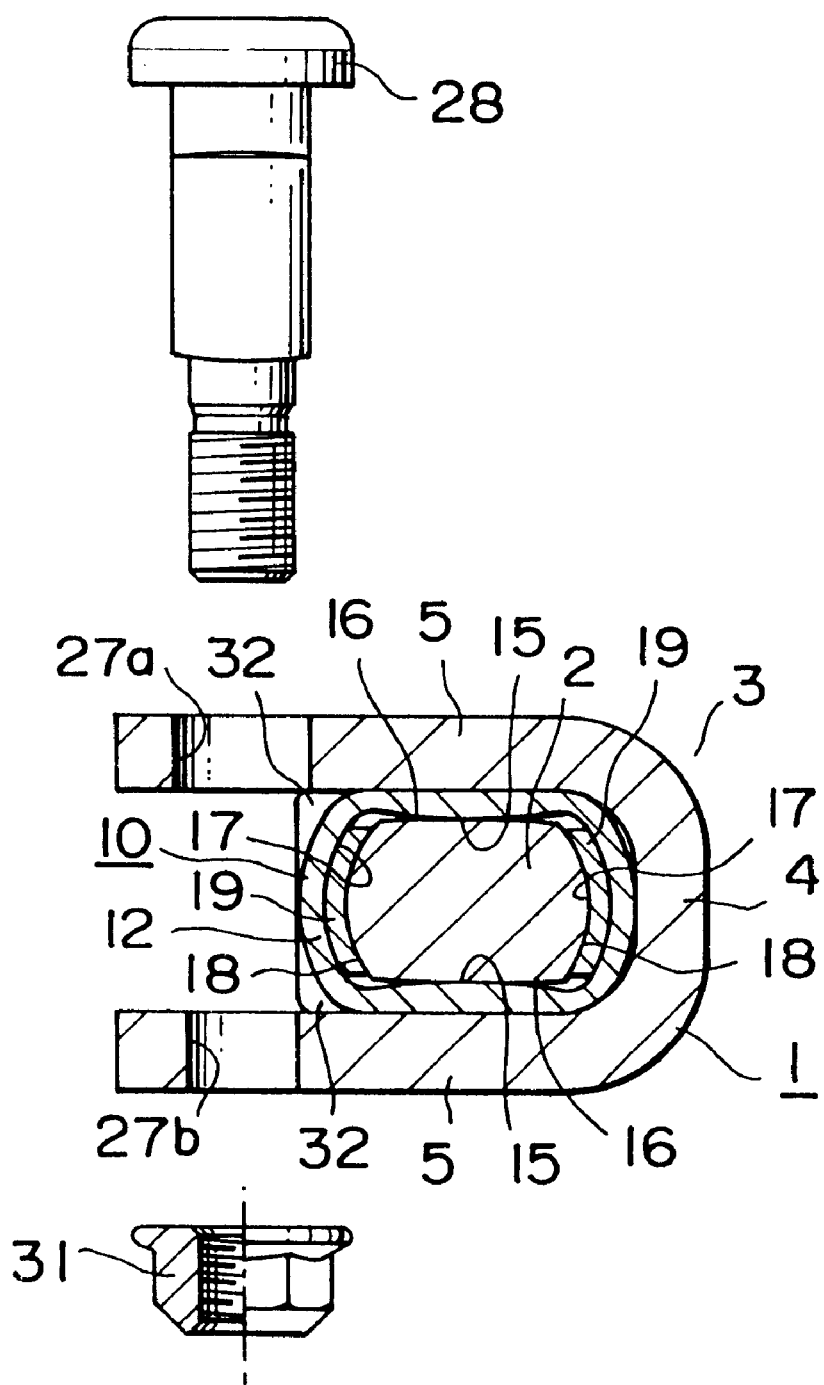
FIG. 4 a view showing a cross section taken along line 4—4 in FIG. 2, in a state that the joint is in the process of assembling.

When the rotation limiting cylinder 12 is inserted into the base portion 4 from the state shown in FIG. 1 up to the state shown in FIG. 4, the bolt 28 is inserted through the through holes 27a, 27b, and further, a nut 31 is screwed onto a portion which is the front end portion of this bolt protruding from the outer side surface of the restraint plate portion 5 to be tightly fastened. As a result, the distance between the paired restraint plate portions 5, 5 is reduced, and the rotation limiting cylinder 12 is tightly sandwiched by and between the inner side surfaces of the two restraint plate portions 5, 5, whereby the coupling sleeve 10 is coupled and fixed to the yoke 1. Note that in order to prevent the front end portions of the restraint plate portions 5, 5 from excessively bending when the bolt 28 and the nut 31 are tightly fastened together, reinforcement ribs 32, 32 are formed on the partial outer peripheral surface of the rotation limiting cylinder 12 at positions near the through holes 27a, 27b at the time of assembling with the base portion 4.

An effect of the elastic shaft joint of the present invention which is constituted and assembled as stated above is as follows when a rotational force is transmitted while preventing transmission of a vibration. In case of the transmission of the rotational force, if the rotational force to be transmitted is of low torque, the rotational force is transmitted through the elastic member 21 which forms the vibration absorbing member 11 mentioned above. For example, when the rotational force is transmitted from the shaft 2 to yoke 1, a rotation of the shaft 2 is transmitted to the elastic member 21 through the paired sleeve elements 23, 23 which constitute the sliding sleeve 22. Then, this elastic member 21 is elastically deformed to transmit this rotational force to the yoke 1. In this manner, when a rotational force to be transmitted is of low torque, or when a rotational force is not to be transmitted, the elastic member 21 prevents the transmission of a vibration between the yoke 1 and the shaft 2. With respect to the vibration and the displacement in the axial direction, not only the elastic member 21 is displaced in the axial direction (deformed in the shearing direction), but also the sliding sleeve 22 slides on the outer peripheral surface of the end portion of the shaft 2, thereby absorbing the vibration and the displacement.

It is possible to set coefficients of friction between the inner-diameter side flat surfaces 25, 25 provided on the inner peripheral surface of the sliding sleeve 22 and the inner-diameter side cylindrical surfaces 26, 26, and the outer peripheral surface of the end portion of the shaft 2 to be small, irrespective of presence or absence of the elastic member 21. Consequently, it is possible to smoothly and effectively absorb the vibration and displacement in the axial direction due to a sliding between the inner-diameter side flat surfaces 25, 25 and the inner-diameter side cylindrical surfaces 26, 26, and the outer peripheral surface of the end portion of the shaft 2. Moreover, the abrasion on the inner-diameter side flat surfaces 25, 25 and the inner-diameter side cylindrical surfaces 26, 26 provided on the inner peripheral surface of the sliding sleeve 22 and the outer peripheral surface of the shaft 2 can be minimized so that the abrasion on both of these peripheral surfaces can be also minimized with a long-term use, thereby securing the durability of the elastic shaft joint.

Also, when the torque of the rotational force to be transmitted is large, the rotational force is transmitted between the shaft 2 and the yoke 1 based on the engagement between the end portion of the shaft 2 and the rotation limiting cylinder 12. More specifically, a part of the outer-diameter side engagement surfaces 16, 16 provided on the outer peripheral surface of the end portion of the shaft 2 is caused to abut upon a part of the inner-diameter side engagement surfaces 15, 15 formed on the inner peripheral surface of the rotation limiting cylinder 12. Then, an extra rotational force which can not be transmitted by the elastic member 21 is transmitted between the outer-diameter side engagement surfaces 16, 16 and the inner-diameter side engagement surfaces 15, 15. Consequently, the durability of this elastic member 21 can be secured satisfactorily without an excessive stress to be applied on the elastic member 21. Note that a part in which the elastic shaft joint of the present invention is to be assembled is, as shown in FIG. 1, not limited to be on the side of the universal joint 33 for coupling the input shaft 35 of the steering gear 34 to the shaft 2, but may be on the side of the universal joint 29 for coupling this shaft 2 to the steering shaft 30.

Figure 5:
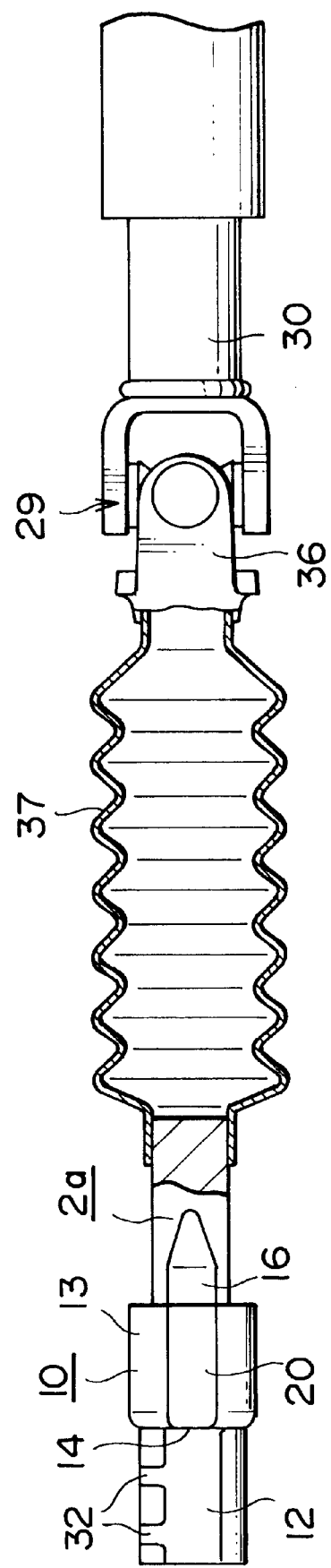
FIG. 5 is a partial cut-away side view for showing a second embodiment of the present invention, with a part omitted therefrom.

Next, FIG. 5 shows a second embodiment of the present invention. In this embodiment, the total length of a shaft 2a for constituting the elastic shaft joint is shorter than that in the first embodiment described above, and a shock absorbing member 37 is arranged between this shaft 2a and a yoke 36 for constituting the universal joint 29 on the side of the steering shaft 30 in series with respect to the shaft 2a and the yoke 36. This shock absorbing member 37 is formed like a bellows made from a metal plate which can be plastically deformed, such as a soft steel plate or a stainless steel plate, and can freely transmit the rotational force. However, when an impact in the axial direction is applied, the total length of this shock absorbing member 37 is reduced while absorbing the energy of this impact.

In the present embodiment, with the shock absorbing member 37 provided in such manner, it is possible to protect the driver more effectively at the time of a collision by mitigating the impact applied on the body of the driver from the steering wheel. That is, when the steering gear 34 (FIG. 1) is pressed backward (to the right in FIG. 1) at the time of the collision, the total length of the shock absorbing member 37 is reduced so as to prevent the steering shaft 30 from being pushed up backward (to the right in FIG. 5). Consequently, the steering wheel which is fixed to the rear end portion of this steering shaft 30 is prevented from being pushed up toward the driver, thereby preventing large shock from being applied onto the body of the driver. Other arrangements and effects are the same as those in the case of the first embodiment described above.

Figure 6:
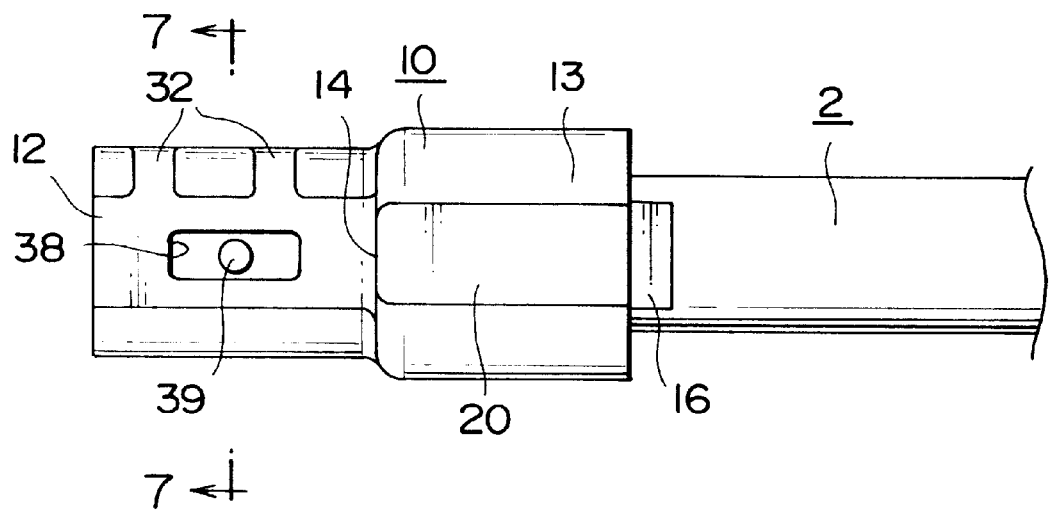
FIG. 6 is a side view for showing a third embodiment of the present invention, with a part omitted therefrom.
Figure 7:
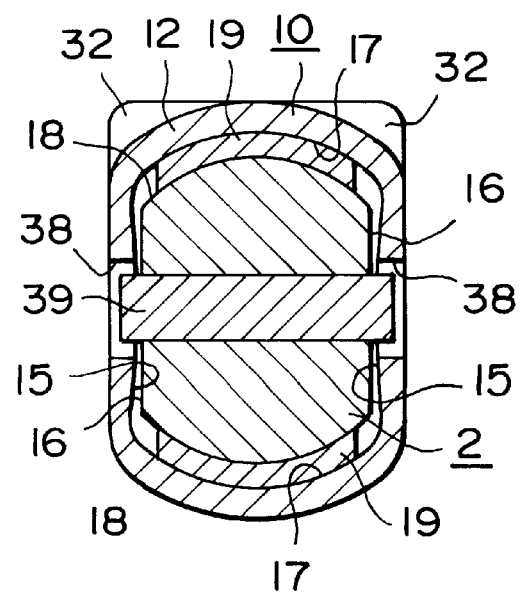
FIG. 7 is a cross-sectional view taken along line 7—7 in FIG. 6.

Next, FIGS. 6 and 7 show a third embodiment of the present invention. In this third embodiment, a stopper is provided between the rotation limiting cylinder 12 of the coupling sleeve 10 and one end portion of the shaft 2 to restrict displacement of the rotation limiting cylinder 12 and the shaft 2 in the axial direction within a predetermined range. Consequently, in the present embodiment, engagement holes 38, 38 which are elongated in the axial direction (the lateral direction in FIG. 6 and the perpendicular direction to the sheet surface in FIG. 7) are provided on the rotation limiting cylinder 12 at two positions on the opposite sides in the radial direction thereof, and an engagement pin 39 is supported by and fixed to the end portion of the shaft 2 as being passed through in the radial direction. Then, both ends of this engagement pin 39 are loosely engaged with the engagement holes 38, 38, thereby preventing the end portion of the shaft 2 from coming off from the rotation limiting cylinder 12.

In such structure of the present embodiment, it is possible to avoid a trouble, by preventing the end portion of the shaft 2 from falling off from the rotation limiting cylinder 12 when the coupling sleeve 10 with the end portion of the shaft 2 attached to one end portion thereof is conveyed or when they are assembled together, caused by the separation of the coupling sleeve 10 from the shaft 2. Other arrangements and effects are the same as those in the case of the first embodiment described above.

Figure 8:
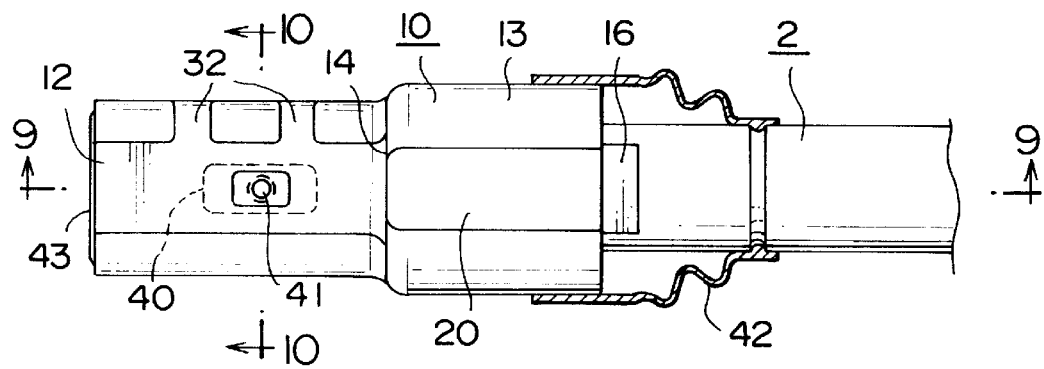
FIG. 8 is a partial cut-away side view for showing a fourth embodiment of the present invention, with a part omitted therefrom.
Figure 9:
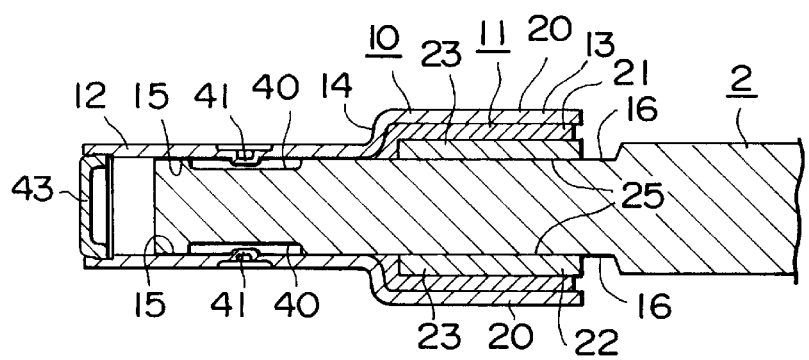
FIG. 9 is a cross-sectional view taken along line 9—9 in FIG. 8 for schematically illustrating bellows.
Figure 10:
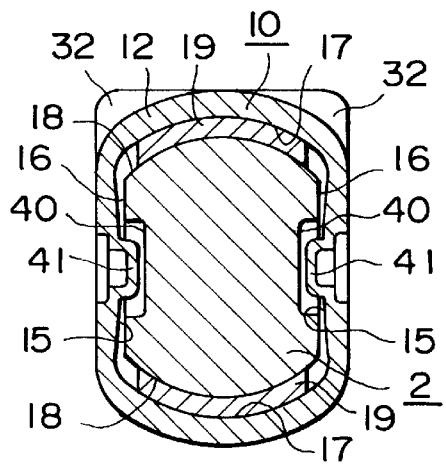
FIG. 10 is a cross-sectional view taken along line 10—10 in FIG. 8.

Next, FIGS. 8 to 10 show a fourth embodiment of the present invention. In this fourth embodiment, there are provided a stopper between the rotation limiting cylinder 12 of the coupling sleeve 10 and the end portion of the shaft 2 to restrict displacement of the rotation limiting cylinder 12 and the shaft 2 in the axial direction within a predetermined range and a sealing member for preventing permeation of water into the coupling sleeve 10. In the present embodiment, the stopper comprises recesses 40, 40 which are formed on the outer peripheral surface of the shaft 2 at two positions on the opposite sides in the radial direction thereof to be elongated in the axial direction (the lateral direction in FIGS. 8 and 9, and the perpendicular direction to the sheet surface in FIG. 10), and protrusions 41, 41 which are formed by expanding thin portions formed at two positions on the opposite sides in the radial direction of the rotational limiting cylinder 12 inward in the radial direction. In the present embodiment, these protrusions 41, 41 are loosely engaged with the recesses 40, 40 to prevent the end portion of the shaft 2 from falling off from the rotation limiting cylinder 12.

Also, in the present embodiment, a bellows 42 which is made of elastic material for serving as a sealing member is provided between an opening end portion of the retaining cylinder 13 for forming the coupling sleeve 10 and the outer peripheral surface of the middle portion of the shaft 2. Further, at an opening end portion of the rotation limiting cylinder 12 for forming the coupling sleeve 10, a lid member 43 which is made of elastic material also for serving as a sealing member is provided. Since the inner and outer peripheral surfaces of the rotation limiting cylinder 12 do not communicate to each other at a portion at which the stopper is provided and the bellows 42 and the lid member 43 are provided as stated, it is possible to prevent rust on the outer peripheral surface of the end portion of the shaft 2 or increase of sliding resistance of the sliding portion by preventing permeation of water or invasion of dust or other foreign substances into the coupling sleeve 10. Other arrangements and effects are the same as those in the first embodiment described above.

Next, FIGS. 11 to 14 show a fifth embodiment of the present invention. In this fifth embodiment, there are provided elastic restraint plates 44, 44 respectively outside the outer side surfaces of the paired restraint plate portions 5, 5 for constituting the base portion 4 of the yoke 1 which serves as the rotary member. Consequently, in the present embodiment, a restraint bracket 45 is formed by bending an elastic metal plate of spring steel, stainless steel, or the like, into a substantially U-shape. This restraint bracket 45 is comprised of the paired elastic restraint plates 44, 44, and a coupling plate portion 46 for coupling the base edges (the right edges in FIG. 12) of these elastic restraint plates 44, 44 to each other. A locking hole 47 is formed at a central portion of this coupling plate portion 46. When the restraint bracket 45 is attached to this base portion 4, a locking protrusion 48 which is formed on the outer peripheral surface of the middle portion of this base portion 4 is thrust into the locking hole 47. The peripheral edge portion of this locking hole 47 is, under this thrust state, inserted into the outer peripheral surface of this locking protrusion 48, thereby preventing separation of the base portion 4 from the restraint bracket 45. Note that the base portion 4 and the restraint bracket 45 may be coupled to each other by a screw or other means.

In either case, in the state that the restraint bracket 45 is coupled to the base portion 4, the elastic restraint plates 44, 44 have the elasticity to come toward the outer side surfaces of the restraint plate portions 5, 5. Also, two locking protruding pieces 49, 49 are provided at each of the front end portions (the upper end portion in FIG. 13), that is four in total, of the elastic restraint plate portions 44, 44. Each of these locking protruding pieces 49, 49 is cut into a U shape, leaving a part on the side of the front edge of the elastic restraint plate 44, to be bent a little (making an acute angle) toward the inner side surface of the elastic restraint plates 44. Such locking protruding pieces 49, 49 are automatically retracted when insertion plate portions 51, 51 which are provided in a supported bracket 50 described later are inserted into gaps 52, 52 between the outer side surfaces of the restraint plate portions 5, 5 and the inner side surfaces of the elastic restraint plates 44, 44. On the other hand, in the state that these insertion plate portions 51, 51 are in the gaps 52, 52, side edges of these insertion plate portions 51, 51 are engaged with the front edges of the locking protruding pieces 49, 49 so as to prevent the insertion plate portions 51, 51 from falling from the gaps 52, 52.

Figure 11:
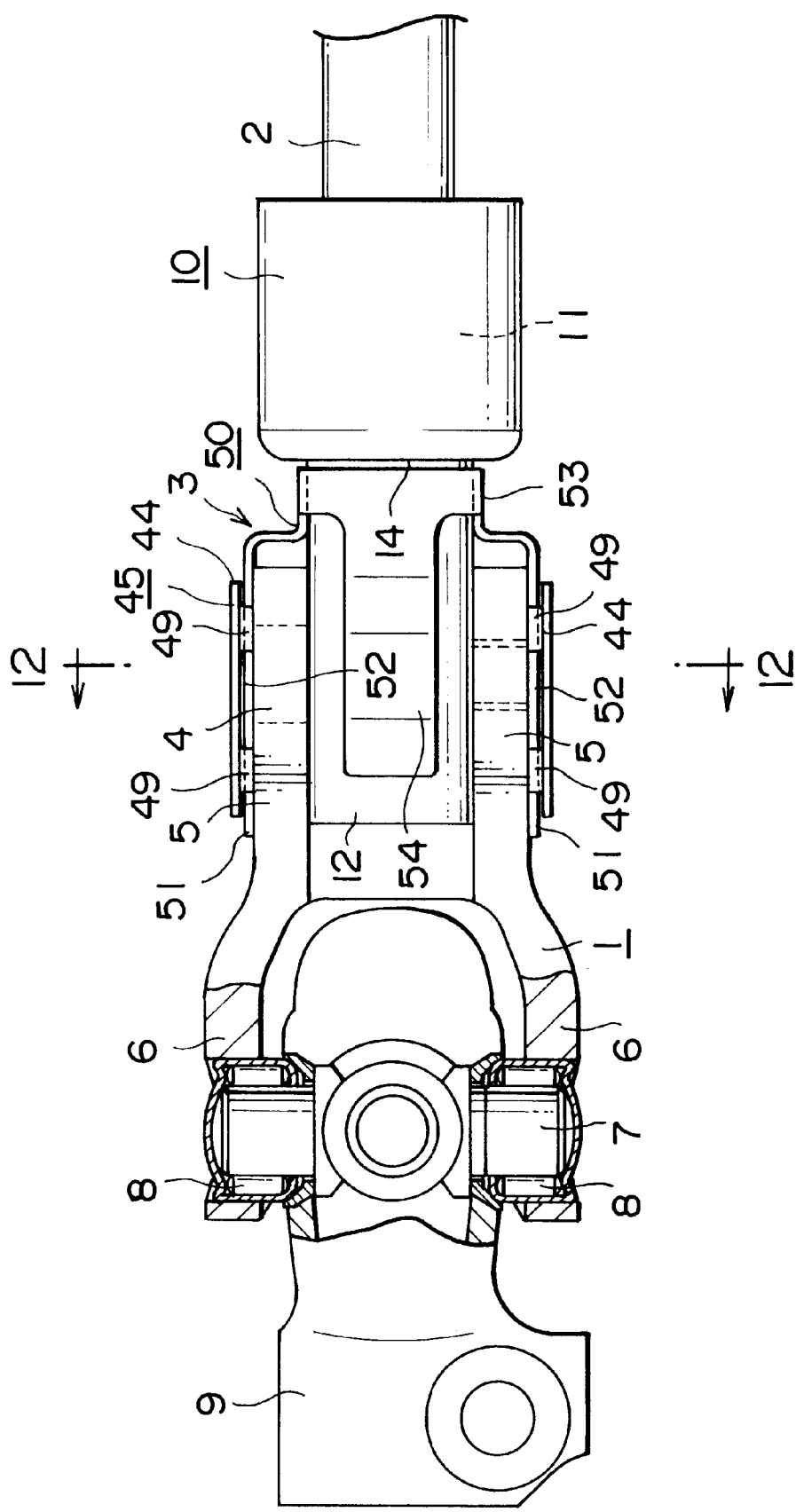
FIG. 11 is a partial cut-away front view for showing a fifth embodiment of the present invention, seen in the same direction as FIG. 2, with a bolt omitted therefrom.
Figure 14:
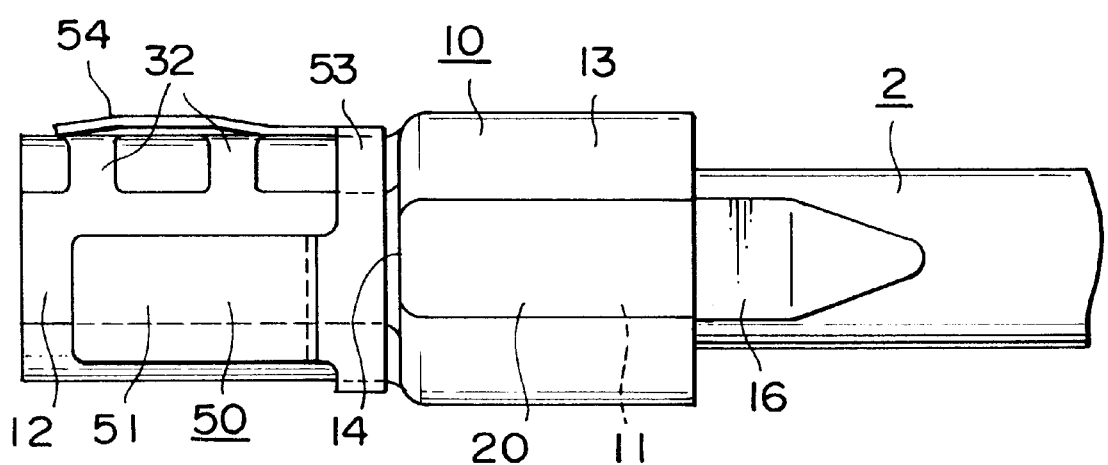
FIG. 14 is a side view for illustrating a shaft with a supported bracket attached thereto, in an enlarged manner.

On the coupling sleeve 10 fitted on the end portion of the shaft 2 via the vibration absorbing member 11, the supported bracket 50 is fitted to be supported on the base portion of the rotation limiting cylinder 12 (the right end portion in FIGS. 11 and 14). This supported bracket 50 is formed of an elastic metal plate, like the restraint bracket 45 described above, and is provided with a supporting annular portion 53 to be fitted on the base portion of the rotation limiting cylinder 12.

Then, each of the base portions of the insertion plate portions 51, 51 is connected to a part of a side edge of this supporting annular portion 53 (the left side edge in FIGS. 11 and 14) which faces each of the flat outer side surfaces formed on the rotation limiting cylinder 12. These insertion plate portions 51, 51 are extended from the annular portion 53 to be respectively formed into L-shapes. The middle portions to the front half portions of these insertion plate portions 51, 51 are formed to be parallel to each other according to the distance between the gaps 52, 52 so that they can be freely inserted into the paired gaps 52, 52. The insertion plate portions 51, 51 can freely advance into the gaps 52, 52 while urging or retracting the locking protruding pieces 49, 49, and after the advancement, are prevented from falling off from the gaps 52, 52 owing to the engagement with these locking protruding pieces 49, 49.

The base portion of an elastic stretching piece 54 is connected to the middle portion of a side edge of the supporting annular portion 53 between the insertion plate portions 51, 51. In the state that both of these insertion plate portions 51, 51 are inserted in the gaps 52, 52, the elastic stretching piece 54 is positioned on the opening side of the base portion 4 (the side facing the reader in FIG. 11 and the left side in FIG. 12).

Further, a bolt 28a which is a coupling member for coupling the yoke 1 and the coupling sleeve 10 together by reducing the distance between the paired restraint plate portions 5, 5 for constituting the base portion 4 has a slant portion 55 of a conic convex plane in a middle part thereof. The outer diameter of this bolt 28a is smaller at a male screw portion 56 which is closer to the front end thereof than this slant portion 55, and is larger at a shank 57 which is closer to the base end thereof than the slant portion 55. A screw hole 58 and a circular hole 59 are formed coaxially at positions which are aligned to each other close to the front ends of the restraint plate portions 5, 5. In the state that the male screw portion 56 of the bolt 28a is threadably engaged with the screw hole 58, out of those holes, the base end portion of the shank 57 is fitted in the circular hole 59 without little backlash, and a part on the outer peripheral surface of the middle portion of this shank 57 in the circumferential direction is brought into contact with the elastic stretching piece 54 elastically.

Figure 12:
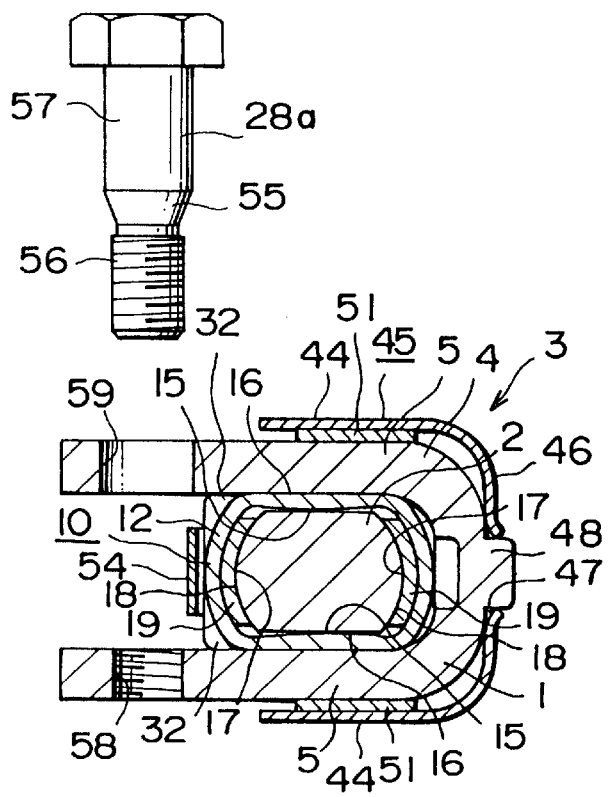
FIG. 12 is a cross-sectional view taken along line 12—12 in FIG. 11, showing a state in the process of assembling, with a part omitted therefrom.
Figure 13:
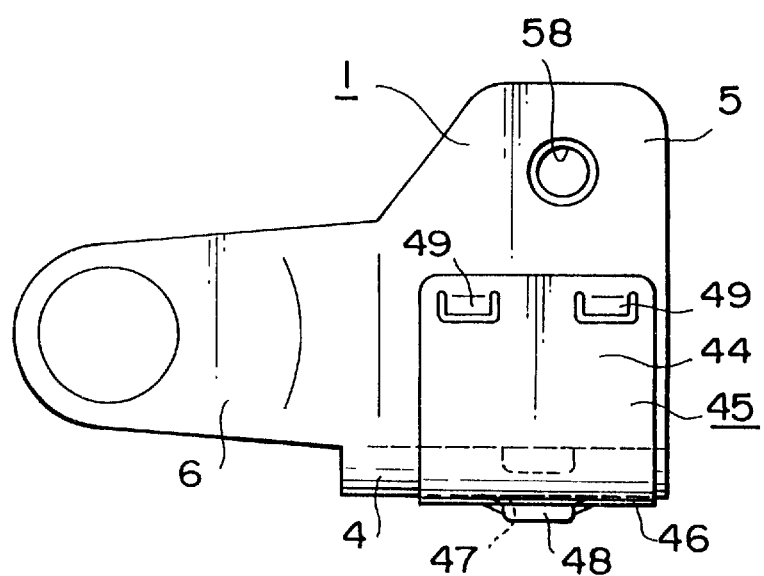
FIG. 13 is a side view for illustrating a yoke with a weight bracket attached thereto, in an enlarged manner.

When the structure of this embodiment is assembled with the above-mentioned constituent members, the coupling sleeve 10 which is fitted on the end portion of the shaft 2 in advance is thrust from an opening into the base portion 4 of the yoke 1 (from left to right in FIG. 12). The restraint bracket 45 is attached to this base portion 4 while the supported bracket 50 is attached to the coupling sleeve 10 in advance. Upon thrusting of the coupling sleeve 10 into the base portion 4 of the yoke 1, the insertion plate portions 51, 51 advance into the gaps 52, 52, and upon completion of this advancement, these insertion plate portions 51, 51 can not come out from the gaps 52, 52 owing to their engagement with the locking protruding pieces 49, 49. Consequently, even prior to the insertion of the bolt 28a into the screw hole 58 and the circular hole 59, the coupling sleeve 10 can not come out from the base portion 4 freely. For this reason, no troublesome work is required any longer, such as the insertion of the bolt 28a which has been conducted while supporting the coupling member 10 and the base portion 4 for coupling the coupling sleeve 10 to the base portion 4, and has been usually carried out in a limited space. Note that when it is required to separate the coupling sleeve 10 from the base portion 4, the elastic restraint plates 44, 44 are elastically deformed to be separated from the restraint plate portions 5, 5, whereby the separation work can be conducted without damaging any constituent member.

When the coupling sleeve 10 is thrust into the base portion 4 of the yoke 1 so as to prevent the coupling sleeve 10 from falling out of the base portion 4 due to the engagement between the insertion plate portions 51, 51 and the locking protruding pieces 49, 49 as stated above, the male screw portion 56 of the bolt 28 which is passed through the circular hole 59 is screwed into the screw hole 58 to be tightly fastened further. In the process of this screwing and fastening, the slant portion 55 which is formed on the outer peripheral surface of the bolt 28a and the elastic stretching piece 54 are brought into engagement, and the coupling piece 10 is elastically pressed upon the interior surface of the base portion 4 owing to this engagement. The forms and the sizes of the coupling sleeve 10 and the base portion 4 are determined such that the central axis of the coupling sleeve 10 and that of the base portion 4 meet each other in the state that a part of the outer peripheral surface of the coupling sleeve 10 and the interior surface of the base portion 4 are in contact to each other in the axial direction (the lateral direction in FIG. 11 and the perpendicular direction to the sheet surface in FIG. 12). The central axis of the coupling sleeve 10 and that of the shaft 2 also meet each other. Consequently, if the shank 57 of the bolt 28a presses the coupling sleeve 10 upon the interior surface of the base portion 4 through the elastic stretching piece 54, it becomes possible to easily conduct a coupling work of the shaft 2 and the yoke 4 together while causing the centers of rotation of both members to meet each other.

Figure 2:
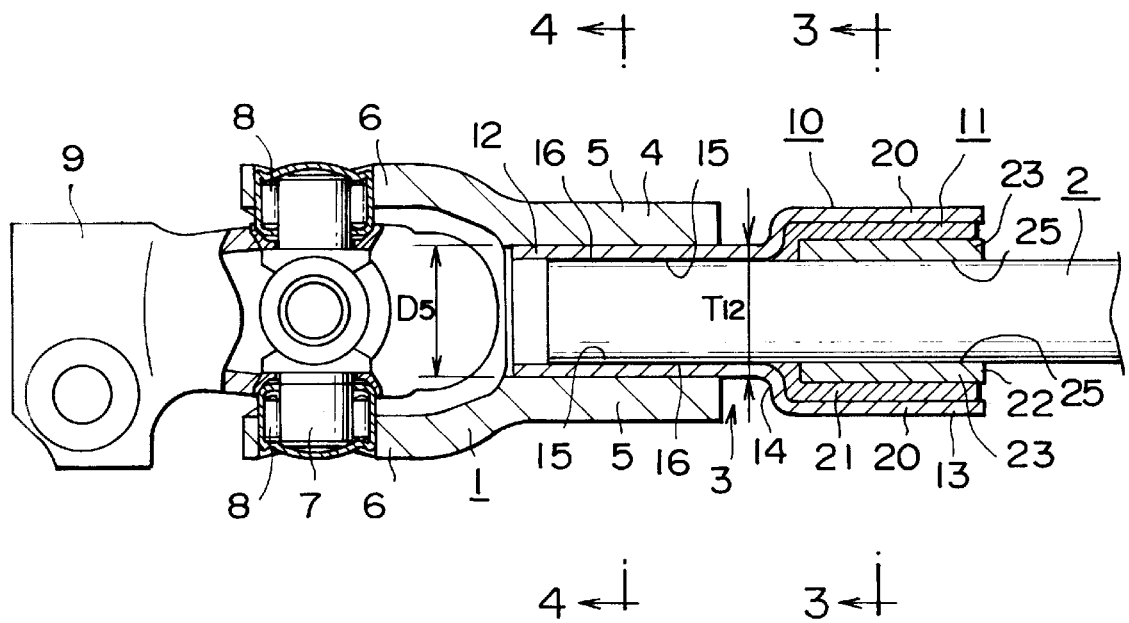
FIG. 2 is a view showing a cross section taken along line 2—2 in FIG. 1, in a state that the joint has been assembled.

Note that the arrangements, operations, and the like of the coupling sleeve 10 and the vibration absorbing member 11, which form the basic structure of the elastic shaft joint 3 to be assembled in the present embodiment, are the same as those in the first embodiment shown in FIGS. 1 to 3 described above. The arrangement for facilitating a coupling work of the end portion of the shaft 2 to the base portion 4 of the yoke 1 while causing the centers of rotation of both members to meet each other, as described in the present embodiment, can be realized as a coupling portion between a yoke of an ordinary universal joint and an end portion of a shaft, even in a structure other than that of the elastic shaft joint embodying the present invention. That is, in some cases, the end portion of the shaft 2 and the base portion 4 of the yoke 1 are directly coupled and fixed to each other without interposing the coupling sleeve 10 or the vibration absorbing member 11 therebetween. In such cases, if the supported bracket 50 is attached to the end portion of the shaft 2 and the restraint bracket 45 is attached to the base portion of the yoke 1, it is also possible to easily conduct a coupling work of the end portion of the shaft 2 to the base portion 4 of the yoke 1 while causing the centers of rotation of both members to meet each other.

Note that as an arrangement for facilitating a coupling work of the end portion of the shaft to the yoke, there are conventionally known those disclosed in U.S. Pat. No. 5,358,350, European Patent No. 0 508 856 A1, and the like. However, those conventional technologies require a work of passing a coupling bolt through a yoke and then rotating the yoke together with the shaft, and the like, to make the arrangement complicated. If the arrangement of this embodiment is employed, such troublesome works can be saved so that it is possible to easily conduct a work for coupling the end portion of the shaft 2 and the yoke 4 together while causing the centers of rotation of the two members to meet each other.

Next, FIGS. 15 to 18 show a sixth embodiment of the present invention. In this sixth embodiment, locking grooves 60, 60 respectively serving as the locking portions are formed on the inner side surfaces of the paired restraint plate portions 5, 5 for constituting the base portion 4 of the yoke 1. Also, a supporting annular portion 53a is fitted on the coupling sleeve 10, so as to support a supported bracket 50a around this coupling sleeve 10. Then, locking protruding pieces 49a, 49a are respectively formed in parts of paired insertion plate portions 51a, 51a which are provided in this supported bracket 50a. Each of these locking protruding pieces 49a, 49a is cut into a U shape, leaving a part on the side of the front edge of the insertion plate portion 51a in the direction of insertion of the insertion thereof, to be bent a little toward the outer side surface of this insertion plate portion 51a. Such locking protruding pieces 49a, 49a are automatically retracted (elastically pressed) when the insertion plate portions 51a, 51a are inserted into gaps 52a, 52a between the inner side surfaces of the restraint plate portions 5, 5 and the respective outer side surfaces of the coupling sleeve 10, together with the end portion of the shaft 2 on which the coupling sleeve 10 is fitted. On the other hand, in the state that these insertion plate portions 51a, 51a are in the gaps 52a, 52a, the locking grooves 60, 60 are engaged with the front end edges of the locking protruding pieces 49a, 49a to prevent the insertion plate portions 51a, 51a from coming off from the gaps 52a, 52a.

Figure 15:
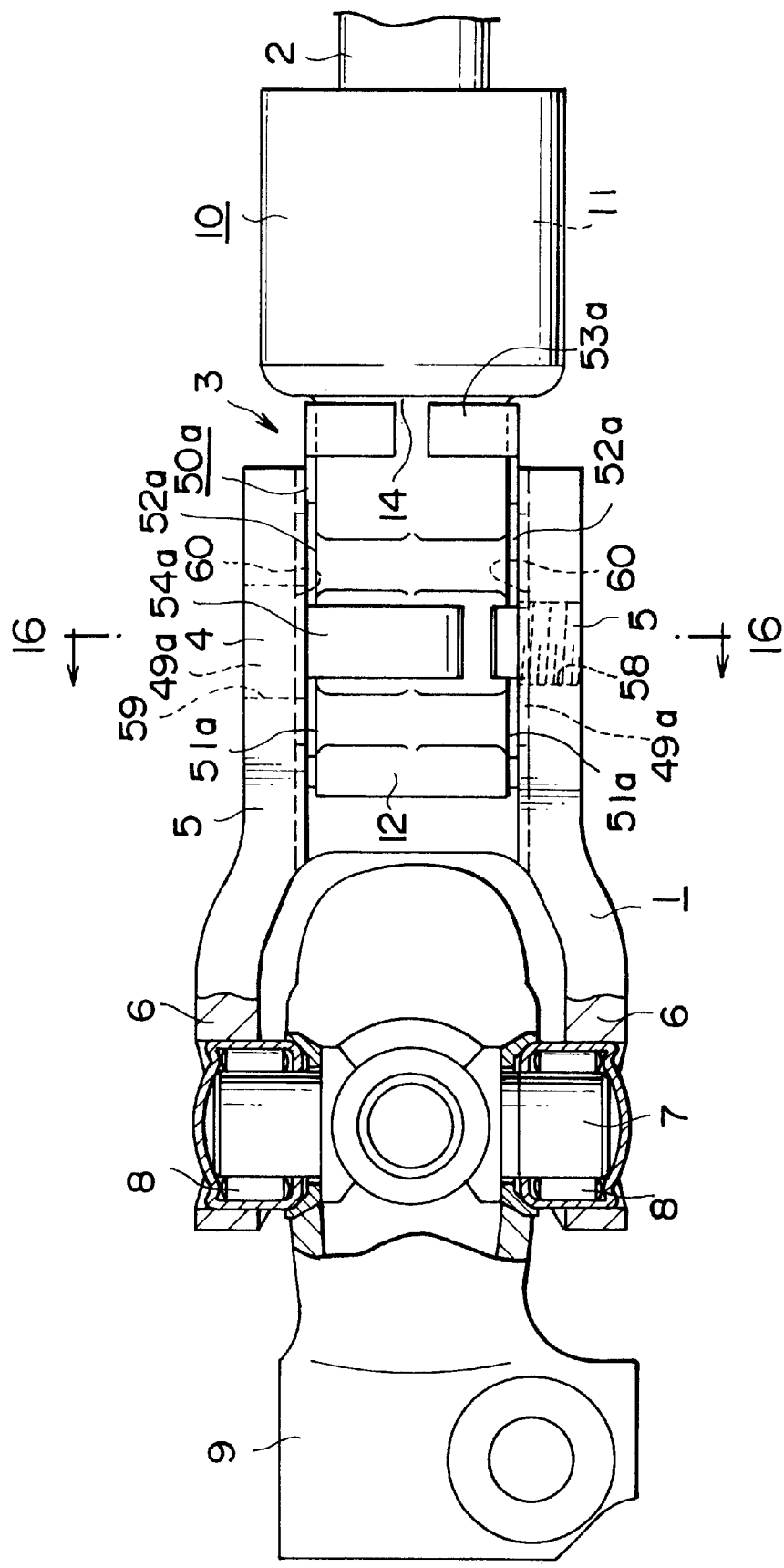
FIG. 15 is a partial cut-away front view for showing a sixth embodiment of the present invention, seen in the same direction as FIG. 2.
Figure 16:
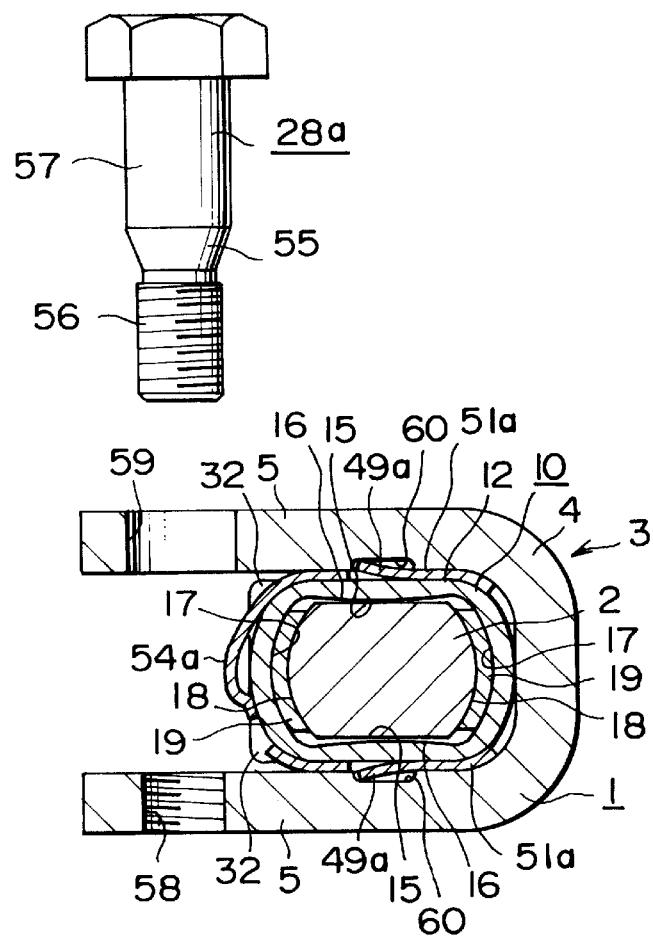
FIG. 16 is a cross-sectional view taken along line 16—16 in FIG. 15, showing a state in the process of assembling, with a part omitted therefrom.
Figure 17:
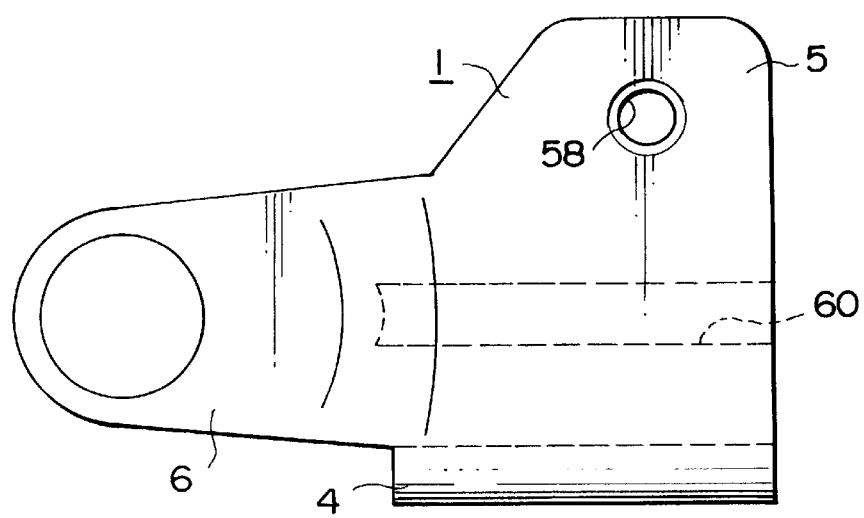
FIG. 17 is a view for illustrating a yoke only in an enlarged manner, seen from below.
Figure 18:
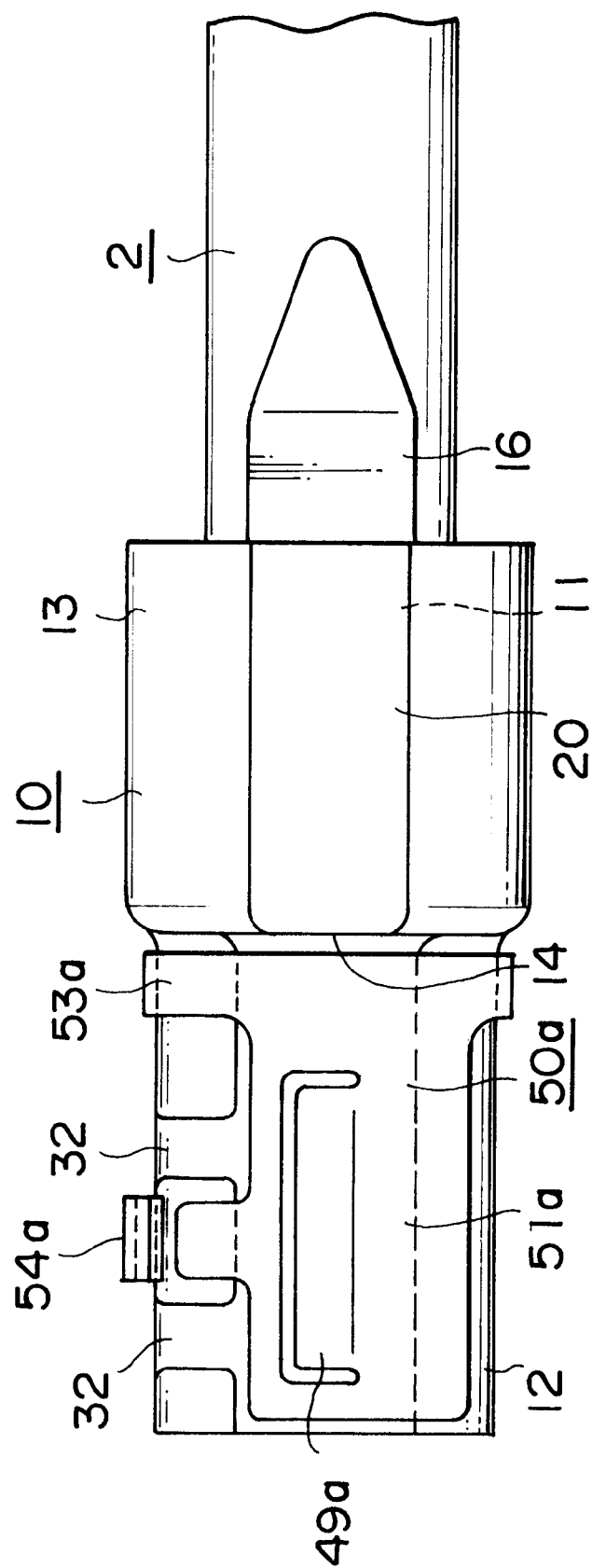
FIG. 18 is a side view for illustrating a shaft with a supported bracket attached thereto, in an enlarged manner.

An elastic stretching piece 54a is protruding from the end edge in the circumferential direction of one of the paired insertion plate portions 51a, 51a (the upper one in FIGS. 15 and 16) toward the end edge of the other insertion plate portion 51a. This elastic stretching piece 54a is positioned in a space between the screw hole 58 and the circular hole 59 which are formed at positions aligned to each other on the restraint plate portions 5, 5, together with the end portion of the shaft 2 and the coupling sleeve 10, as shown in FIGS. 15 and 16, in the state that the supported bracket 50a is inserted between the paired restraint plate portions 5, 5 for constituting the base portion 4 of the yoke 1. Then, if the male screw portion 56 of the bolt 28a which is passed through this circular hole 59 is screwed into the screw hole 58 to be further fastened, the coupling sleeve 10 is elastically pressed upon the interior surface of the base portion 4 on the basis of the engagement between the slant portion 55 and the shank 57 formed on the outer peripheral surface of the bolt 28a and the elastic stretching piece 54a. That is, in the present embodiment, the shaft 2 and the yoke 1 are combined together on the basis of the same effects as described in the fifth embodiment shown in FIGS. 11 to 14, thereby further facilitating a work of coupling the two members together while causing the centers of rotation of the both members to meet each other.

Figure 19:
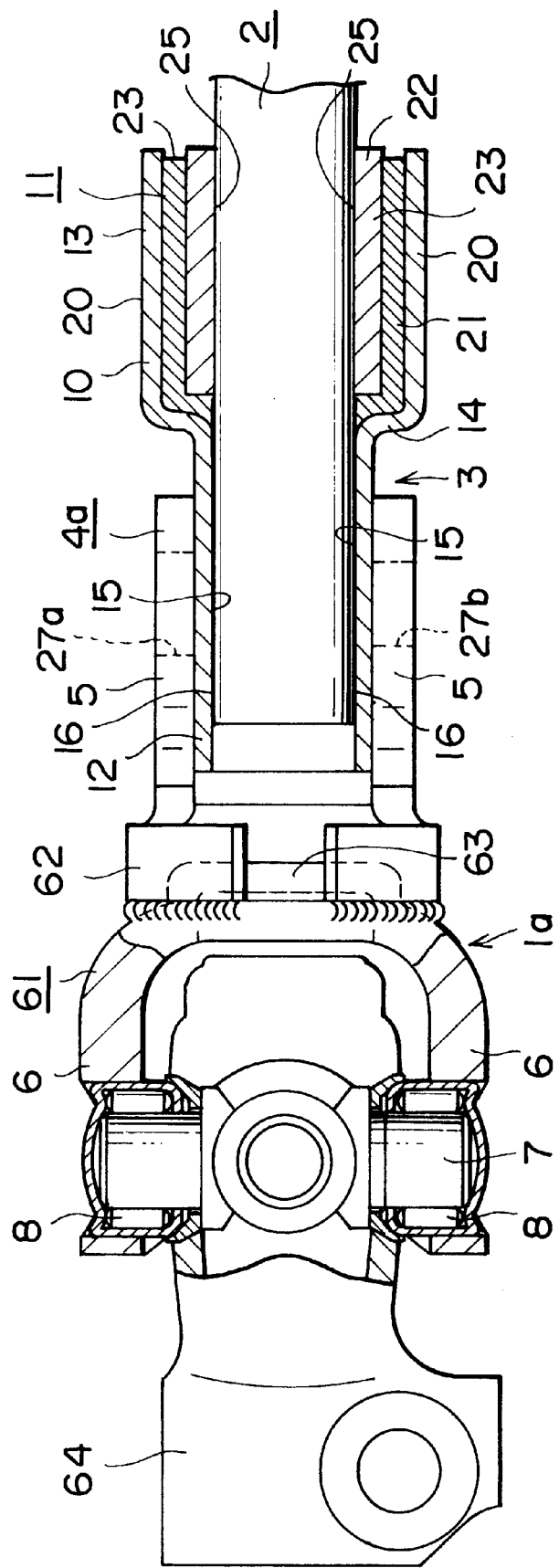
FIG. 19 is a partial cut-away front view for showing a seventh embodiment of the present invention, seen in the same direction as FIG. 2.
Figure 20:
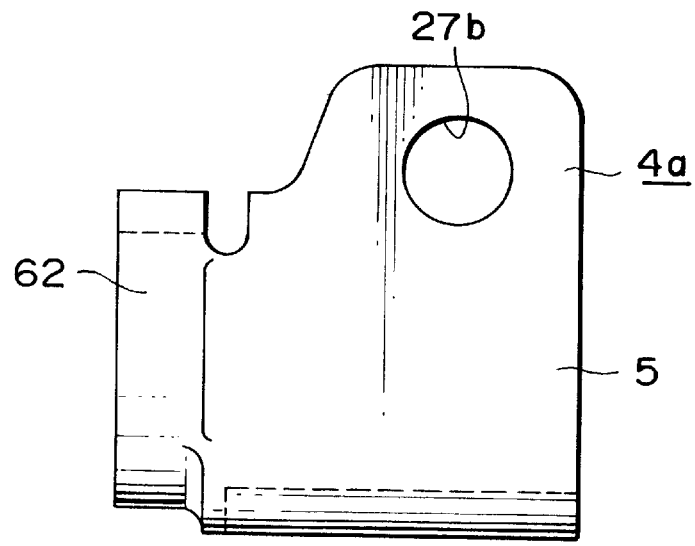
FIG. 20 is a side view for illustrating a base portion for forming the yoke only, in an enlarged manner.
Figure 21:
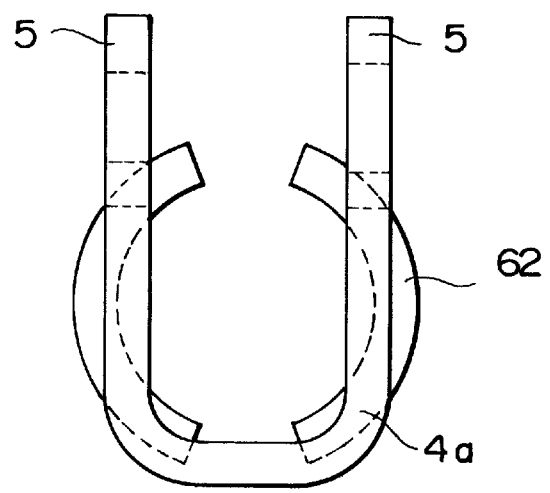
FIG. 21 is a view seen from the right side of FIG. 20.

Next, FIGS. 19 to 21 show a seventh embodiment of the present invention. In this seventh embodiment, a front half portion 61 having a pair of arms 6, 6 and a base portion 4a having a pair of restraint plate portions 5, 5 are separately formed and then are subjected to welding to be fixed to each other, thereby constituting a yoke 1a for forming a universal joint. The front half portion 61 and the base portion 4a are respectively formed of steel plates by plastic working based on pressing. In order to couple the front half portion 61 to the base portion 4a, which are formed separately in the above mentioned manner, by welding, a coupling annular portion 62 with a cut-away part is provided at the front end portion of this base portion 4a. Also, there is formed on the base end surface of this front half portion 61 a circular protrusion 63 on which the coupling annular portion 62 can be fitted. The coupling annular portion 62 is caused to abut upon the end surface of this front half portion 61 in the state of being fitted on the circular protrusion 63 and the abutting part is welded along the total length thereof, thereby coupling the base portion 4a and the front half portion 81 together.

In the present embodiment constituted as described above, a phase between the arms 6, 6 and the restraint plate portions 5, 5 in the direction of rotation can be set as desired. For this reason, a phase between a partner yoke 64 and the restraint plate portions 5, 5 in the direction of rotation can be also set as desired when the universal joint is arranged. As a result, the degree of freedom in designing the joint can be enhanced. Further, it is possible to set optimal values for the thickness of a steel plate for forming the front half portion 61 and the thickness of a steel plate for forming the base portion 4a in accordance with the, strength required for the respective parts. For this reason, it is possible to reduce the weight of the yoke 1a by preventing the thickness from being partially too large. Note that the structure of the present embodiment can be realized by selectively combining some of the structures of the foregoing first to sixth embodiments.

Figure 22:
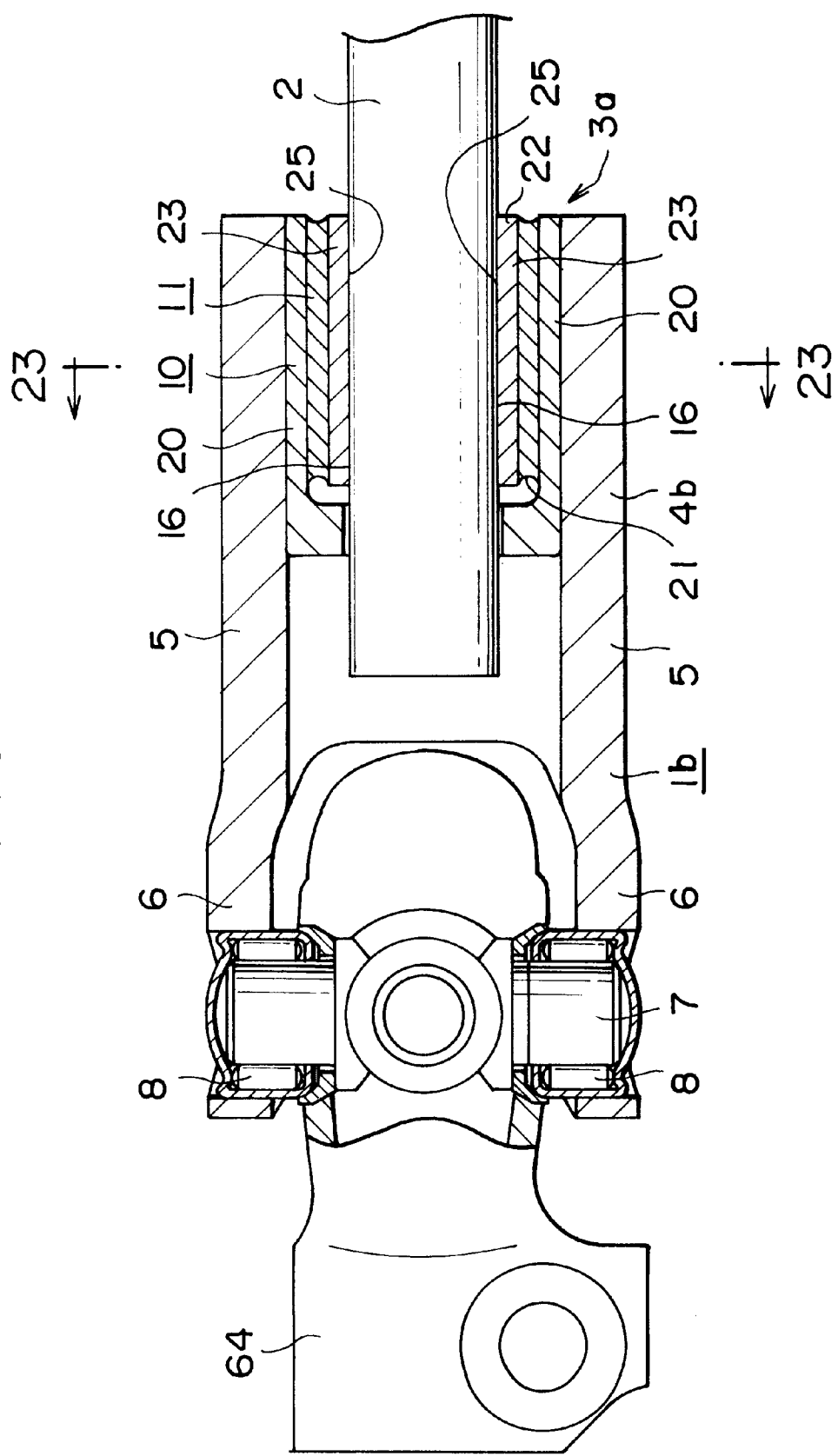
FIG. 22 is a partial cut-away front view for showing an eighth embodiment of the present invention, seen in the same direction as FIG. 2.
Figure 23:
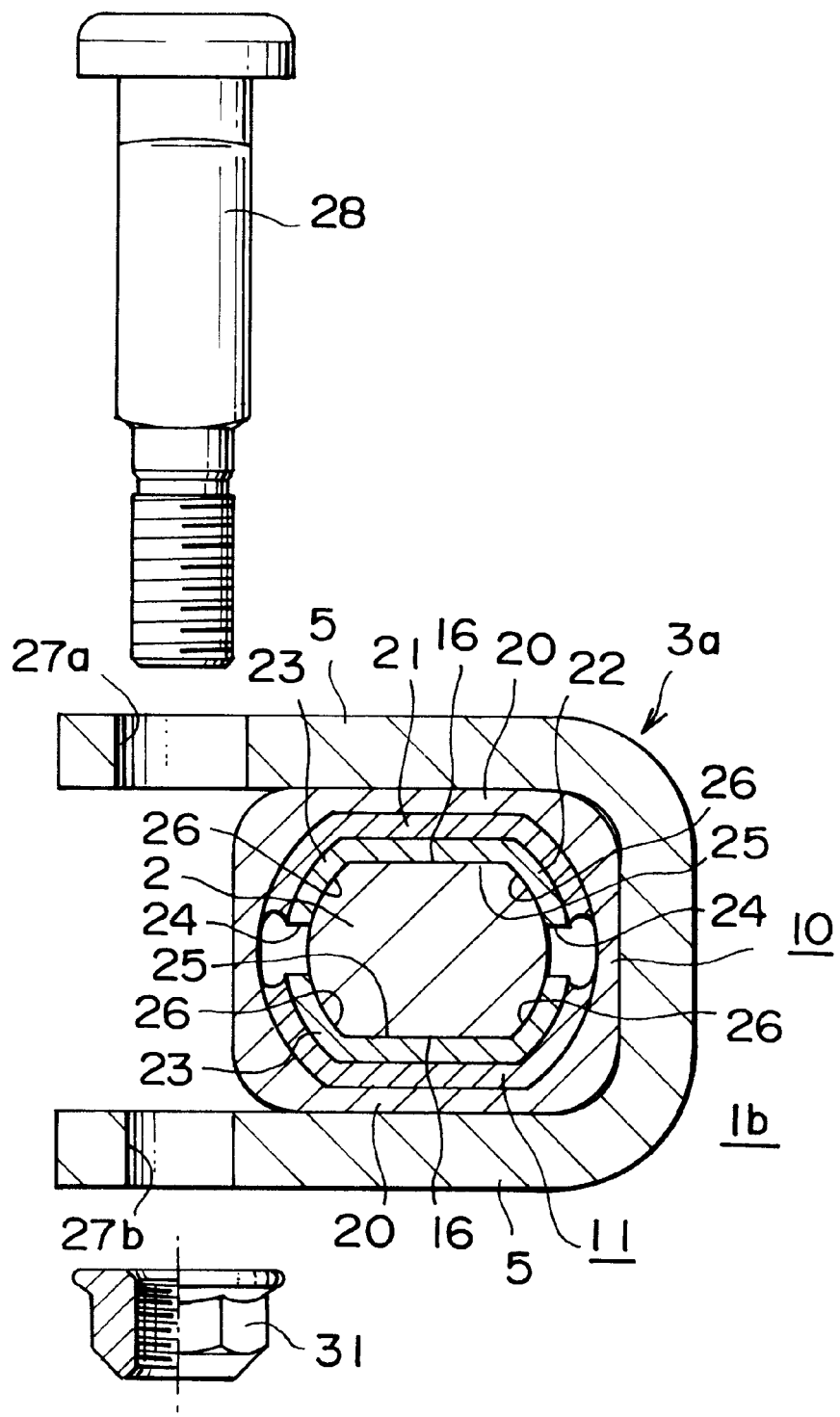
FIG. 23 is a cross-sectional view taken along line 23—23 in FIG. 22, showing a state in the process of assembling, with a part omitted therefrom.
Figure 24:
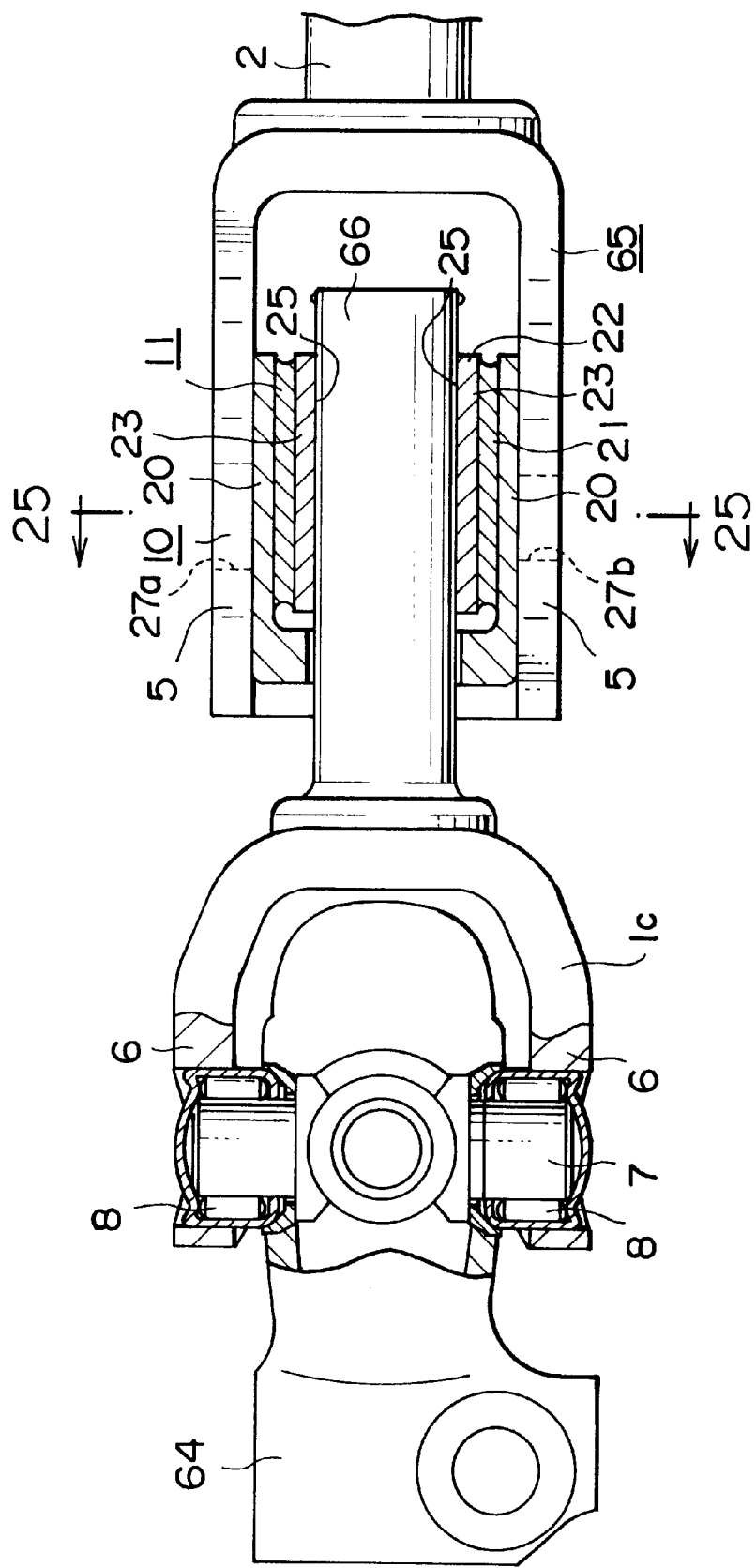
FIG. 24 is a partial cut-away front view for showing a ninth embodiment of the present invention, seen in the same direction as FIG. 2.
Figure 25:
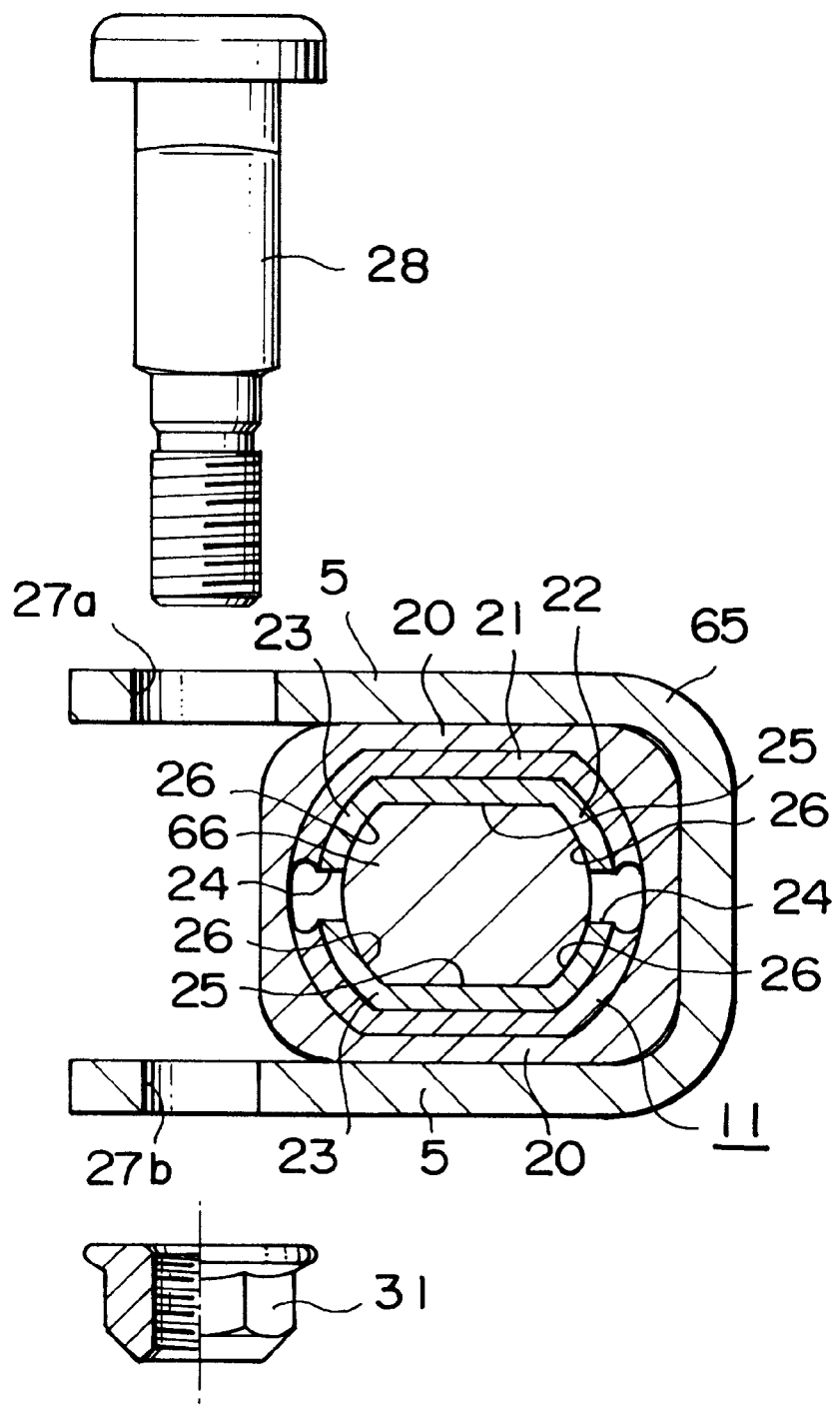
FIG. 25 is a cross-sectional view taken along line 25—25 in FIG. 24, showing a state in the process of assembling, with a part omitted therefrom.
Figure 26:
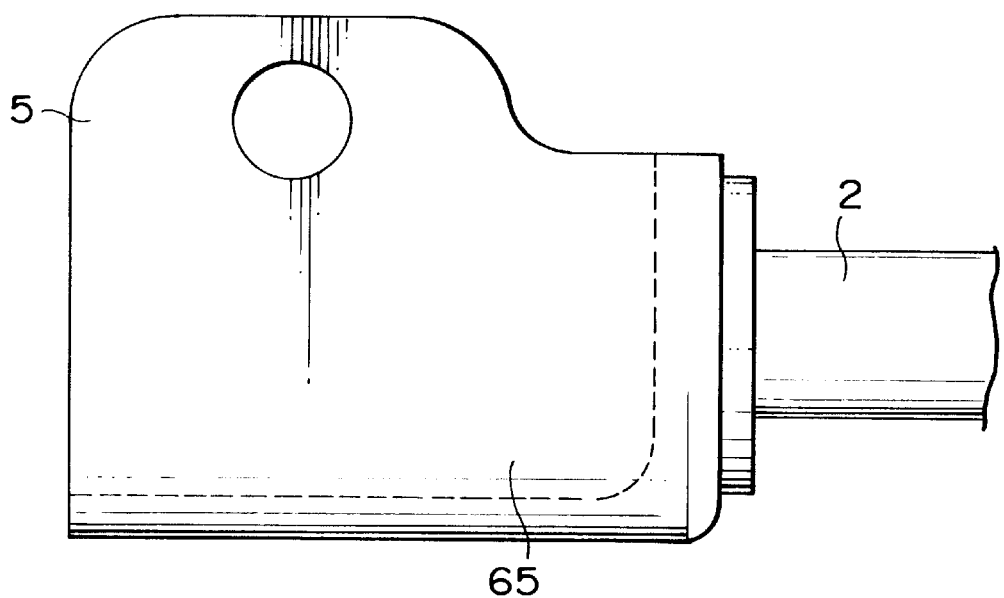
FIG. 26 is a side view for illustrating a coupling bracket fixed to an end portion of the shaft, seen from below.
Figure 27:
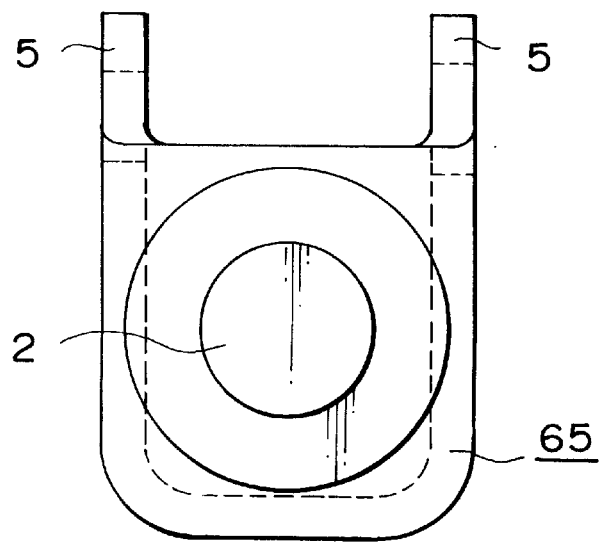
FIG. 27 is a view seen from the right side of FIG. 26.

Next, FIGS. 22 to 23 show an eighth embodiment of the present invention. In the eighth embodiment, the entire coupling sleeve 10 is disposed between the paired restraint plates 5, 5 for forming the yoke 1b. That is, the structure of this embodiment is different from that of the first embodiment shown in FIGS. 1 to 4 in that the rotation limiting cylinder 12 is omitted and the vibration absorbing member 11 and the sliding sleeve 22 are disposed between the outer peripheral surface of the end portion of the shaft 2 and the inner peripheral surface of the base portion 4b of the yoke 1b. According to such structure of the eighth embodiment, the size of an elastic shaft joint 3a in the axial direction thereof and, in turn, the total length of the universal joint which assembles this elastic shaft joint 3a therein can be reduced. As a result, a design for effectively protecting the driver can be achieved more easily by increasing an amount of displacement of the shaft 2 in the axial direction thereof in case of a collision. The structure of the present embodiment can also be realized by selectively combining some of the structures of the foregoing first to seventh embodiments.

Next, FIGS. 24 to 27 show a ninth embodiment of the present invention. In the ninth embodiment, a coupling bracket 65 having a pair of restraint plate portions 5, is fixed to an end portion of the shaft 2 by welding, or the like, while a shaft 66 having an oval-shaped cross section is fixed to the base portion of a yoke 1c by welding, or the like. Then, the vibration absorbing member 11 and the sliding sleeve 22 are disposed between the outer peripheral surface of this shaft 66 and the inner peripheral surface of the coupling bracket 65. Other structures and effects of the present embodiment are the same as those in the eighth embodiment described above. In the present embodiment, the coupling bracket 65 is equivalent for the rotary member.

Figure 28:
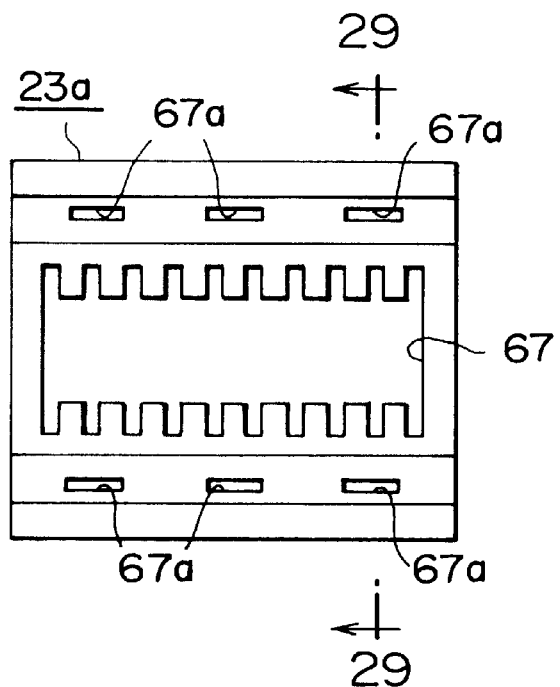
FIG. 28 is a side view of an inner periphery of a sleeve element according to a tenth embodiment of the present invention.
Figure 29:
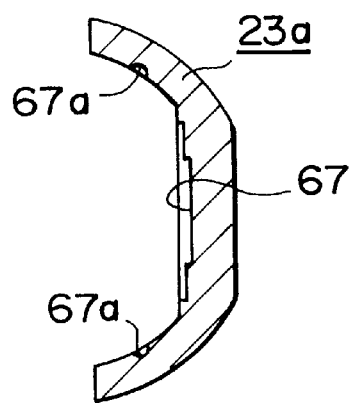
FIG. 29 is a cross-sectional view taken along line 29—29 in FIG. 28.

Next, FIGS. 28 and 29 show a tenth embodiment of the present invention. In the tenth embodiment, grooves 67, 67a for retaining grease are formed on the inner peripheral surface of a sleeve element 23a for forming the sliding sleeve 22 (see, for example, FIGS. 2 and 3). The grease retained in these grooves 67, 67a smoothly slides on a sliding contact surface between the inner peripheral surface of the sliding sleeve 22 and the outer peripheral surface of the shaft in the structure with the elastic shaft joint so that the displacement in the axial direction can be performed smoothly. Note that such sleeve element 23a can be combined with any of the structures of the foregoing embodiments.

Since arranged and operated as described above, the present invention can contribute to realize an elastic shaft joint of practical use which can absorb a large displacement in the axial direction and with a satisfactory secured durability though it can be manufactured at a low cost without requiring complicated processing works.

What is claimed is:

1. An elastic shaft joint for coupling an end portion of a rotatable shaft to a rotary member for rotating upon a rotation of this shaft to absorb some displacement thereof in the axial direction and the direction of rotation, wherein said shaft is provided with a pair of outer-diameter side engagement surfaces which are substantially parallel to each other at two positions on the opposite sides in the radial direction of the outer peripheral surface of at least one end of the shaft, a coupling sleeve is disposed in the vicinity of an end portion of the shaft to be extended in the axial direction of said shaft, provided with inner-diameter side engagement surfaces which are substantially parallel to each other at two positions on the inner peripheral surface on the opposite sides in the radial direction in a half part in the axial direction closer to the one end of this shaft to face said outer-diameter side engagement surfaces with a gap therebetween in a neutral state in which no phase shift is generated with respect to the direction of rotation between said coupling sleeve and said shaft, a rotation limiting cylinder for limiting an amount of rotation of said shaft within said coupling sleeve, a retaining cylinder having a larger diameter than that of the rotation limiting cylinder is provided in the other half part of said coupling sleeve in the axial direction, which is a part closer to a middle portion of this shaft, a vibration absorbing member is provided between the inner peripheral surface of this retaining cylinder and the outer peripheral surface of one end of said shaft for preventing a vibration from being transmitted to and from the coupling sleeve in said neutral state so as to allow a displacement in the axial direction of said shaft with respect to this coupling sleeve, and the base portion of said rotary member to which the end portion of said shaft is coupled and fixed is formed to have a pair of restraint plate portions which are substantially parallel to each other and an opening on the lateral side thereof, and in the state in which the rotation limiting cylinder of said coupling sleeve is inserted between these two restraint plate portions through said lateral opening, these restraint plate portions are suppressed toward each other, thereby connecting and fixing said coupling sleeve to said rotary member.

2. An elastic shaft joint for coupling an end portion of a rotatable shaft to a rotary member, wherein:

the end portion of the shaft is formed with a pair of outer-diameter side engagement surfaces which are extended over a predetermined length in an axial direction substantially parallel to each other, said end portion having a first part and a second part next to the first part both extended in the axial direction, the first part including a tip end portion of the shaft and the second part being continuous to the first part;

said rotary member has a portion formed with a substantially U-shaped cross-section including a pair of restraint plate portions which are extended axially of said rotary member and substantially parallel to each other; and a vibration absorbing device is provided between said end portion of the shaft and said rotary member;

said vibration absorbing device including a coupling sleeve having a first tubular portion and a second tubular portion, said first tubular portion being fitted on said first part of said shaft end portion and received between said pair of restraint plate portions, whereby rotation can be transmitted from said shaft to said rotary member, and said second tubular portion being extended axially along said second part of said shaft end portion;

said vibration absorbing device further including a vibration absorbing member provided between said second tubular portion of the coupling sleeve and said second part of said shaft end portion, the vibration absorbing member being composed of an elastic member disposed on an inner peripheral surface of said second tubular portion and a pair of sliding sleeve-sections supported in circumferentially spaced locations on an inner peripheral surface of the elastic member with axially extended gaps therebetween, inner surfaces of said sleeve-sections having portions which are slidably pressure-contacted, respectively, with said outer-diameter side engagement surfaces of said shaft end portion.

3. An elastic shaft joint according to claim 2, wherein said first tubular portion of said sleeve and said first part of said shaft end portion are configured to permit a slight relative rotation therebetween.

4. An elastic shaft joint according to claim 3, further comprising low frictional guide means disposed between said first tubular portion of said sleeve and said first part of said shaft end portion.

* * * * *